(12) United States Patent
Schneider et al.

(10) Patent No.: US 8,209,669 B2
(45) Date of Patent: *Jun. 26, 2012

(54) SYSTEM AND METHOD FOR SUPPORTING SOFTWARE

(75) Inventors: Thomas Schneider, Heidelberg (DE); Juergen Sattler, Wiesloch (DE); Tilmann Haeberle, Wiesloch (DE)

(73) Assignee: SAP AG, Walldorf (DE)

( * ) Notice: Subject to any disclaimer, the term of this patent is extended or adjusted under 35 U.S.C. 154(b) by 1173 days.

This patent is subject to a terminal disclaimer.

(21) Appl. No.: 11/738,163

(22) Filed: Apr. 20, 2007

(65) Prior Publication Data

US 2008/0262860 A1 Oct. 23, 2008

(51) Int. Cl.
 G06F 9/44 (2006.01)
(52) U.S. Cl. ........ 717/127; 717/124; 717/125; 717/126; 717/135
(58) Field of Classification Search .................. None
See application file for complete search history.

(56) References Cited

U.S. PATENT DOCUMENTS

| | | | |
|---|---|---|---|
| 5,867,712 A * | 2/1999 | Shaw et al. .................... | 717/127 |
| 6,177,932 B1 | 1/2001 | Galdes et al. | |
| 6,292,830 B1 * | 9/2001 | Taylor et al. .................. | 709/224 |
| 6,363,488 B1 * | 3/2002 | Ginter et al. ....................... | 726/1 |
| 6,389,402 B1 * | 5/2002 | Ginter et al. ..................... | 705/51 |
| 6,553,563 B2 | 4/2003 | Ambrose et al. | |
| 6,615,253 B1 * | 9/2003 | Bowman-Amuah .......... | 709/219 |
| 6,636,242 B2 * | 10/2003 | Bowman-Amuah .......... | 715/764 |
| 6,748,583 B2 | 6/2004 | Aisenbud-Reshef et al. | |
| 6,804,814 B1 | 10/2004 | Ayers et al. | |
| 6,817,010 B2 * | 11/2004 | Aizenbud-Reshef et al. | 717/127 |
| 6,907,546 B1 | 6/2005 | Haswell et al. | |
| 6,918,108 B2 | 7/2005 | Rajaram | |
| 7,519,960 B2 | 4/2009 | Mei et al. | |
| 7,543,276 B2 | 6/2009 | Pfander et al. | |
| 7,543,279 B2 | 6/2009 | Ayers et al. | |
| 7,584,294 B2 * | 9/2009 | Plamondon ................... | 709/233 |
| 7,607,124 B2 | 10/2009 | Gooty et al. | |
| 7,620,940 B2 | 11/2009 | Goldsmith et al. | |
| 7,689,558 B2 | 3/2010 | Rossmann | |
| 7,774,172 B1 * | 8/2010 | Yunt et al. ......................... | 703/2 |
| 7,869,425 B2 * | 1/2011 | Elliott et al. .................. | 370/352 |
| 7,904,889 B2 | 3/2011 | Avitzur et al. | |

(Continued)

OTHER PUBLICATIONS

Title: Development of a hybrid type assessment method for power system dynamic reliability, author: Miki et al, source: IEEE, dated: Oct. 5, 1999.*

(Continued)

*Primary Examiner* — Chameli Das
(74) *Attorney, Agent, or Firm* — Fish & Richardson P.C.

(57) ABSTRACT

This disclosure provides various embodiments of software for supporting a business application. In one aspect, the software receives error information and dynamic context information from a remote business application, where the dynamic context information may partially identify the particular execution point of the business application and a portion of the business data associated with that execution point, present a search interface to a support user utilizing search criteria that is automatically populated using the received information, and, upon request of the support user, generates an execution environment that simulates the remote business application execution using the received information. In some implementations, the software is further operable to retrieve static context information related to the remote business application from a static context information repository. In those instances, the execution environment for the support user may be generated using at least a portion of the retrieved static context information.

21 Claims, 17 Drawing Sheets

U.S. PATENT DOCUMENTS

| | | | |
|---|---|---|---|
| 7,930,683 B2 | 4/2011 | Li | |
| 7,958,486 B2 | 6/2011 | Tsyganskiy et al. | |
| 8,037,454 B2 | 10/2011 | Bates et al. | |
| 2002/0120918 A1* | 8/2002 | Aizenbud-Reshef et al. | 717/127 |
| 2003/0229884 A1* | 12/2003 | Carr et al. | 717/101 |
| 2005/0033626 A1 | 2/2005 | Kruse et al. | |
| 2005/0033631 A1 | 2/2005 | Wefers et al. | |
| 2005/0288987 A1 | 12/2005 | Sattler et al. | |
| 2006/0010025 A1 | 1/2006 | Sattler et al. | |
| 2006/0010051 A1 | 1/2006 | Sattler et al. | |
| 2006/0015376 A1 | 1/2006 | Sattler et al. | |
| 2006/0015859 A1 | 1/2006 | Sattler et al. | |
| 2006/0026166 A1 | 2/2006 | Sattler et al. | |
| 2006/0031775 A1 | 2/2006 | Sattler et al. | |
| 2006/0112106 A1 | 5/2006 | Wolf et al. | |
| 2006/0143034 A1 | 6/2006 | Rothermel et al. | |
| 2006/0161505 A1 | 7/2006 | Sattler et al. | |
| 2006/0229890 A1 | 10/2006 | Sattler et al. | |
| 2006/0259272 A1 | 11/2006 | Sattler et al. | |
| 2007/0136342 A1 | 6/2007 | Singhai et al. | |
| 2007/0245409 A1* | 10/2007 | Harris et al. | 726/5 |
| 2007/0288885 A1* | 12/2007 | Brunel et al. | 717/104 |
| 2008/0127120 A1* | 5/2008 | Kosche et al. | 717/131 |
| 2008/0127200 A1* | 5/2008 | Richards et al. | 718/106 |
| 2009/0147010 A1* | 6/2009 | Russell et al. | 345/473 |

OTHER PUBLICATIONS

Duc et al.; "Uniform Object Modeling Methodology and Reuse of Real Time System Using UML"; ACM EMSOFT; 2005; pp. 44-47.

Chen et al.; "Algorithms for HLA Based Distributed Simulation Cloning"; ACM Trans on Modeling and Comput Simulation; vol. 15, No. 4; 2005; pp. 316-345.

Canfora et al.; "New Frontiers of Reverse Engineering"; IEEE FOSE; 2007; pp. 1-16.

Kawachiya et al.; "Clonable JVM a New Approach to Start Isolated Java Applications Faster"; ACM VEE; 2007; pp. 1-11.

* cited by examiner

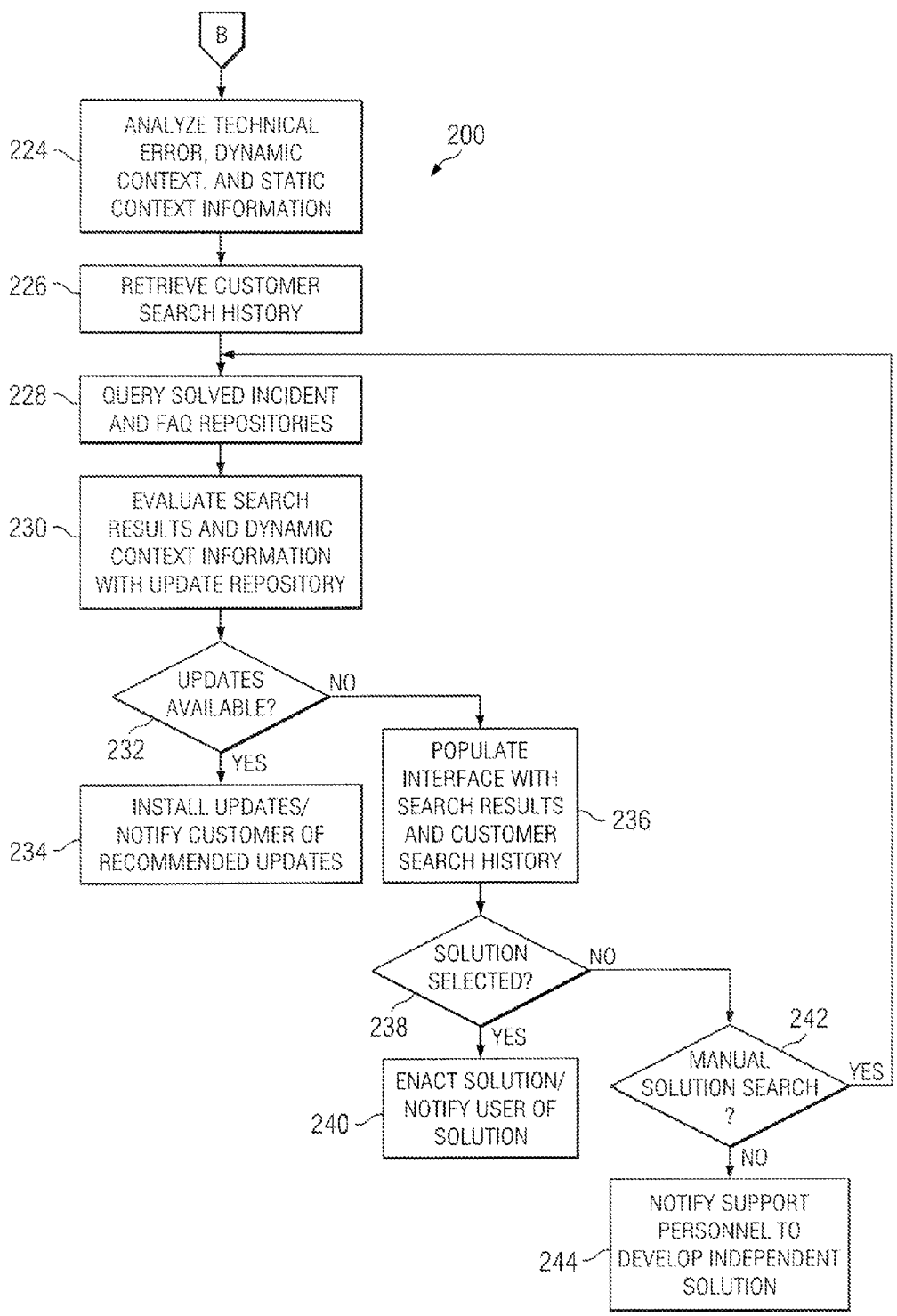

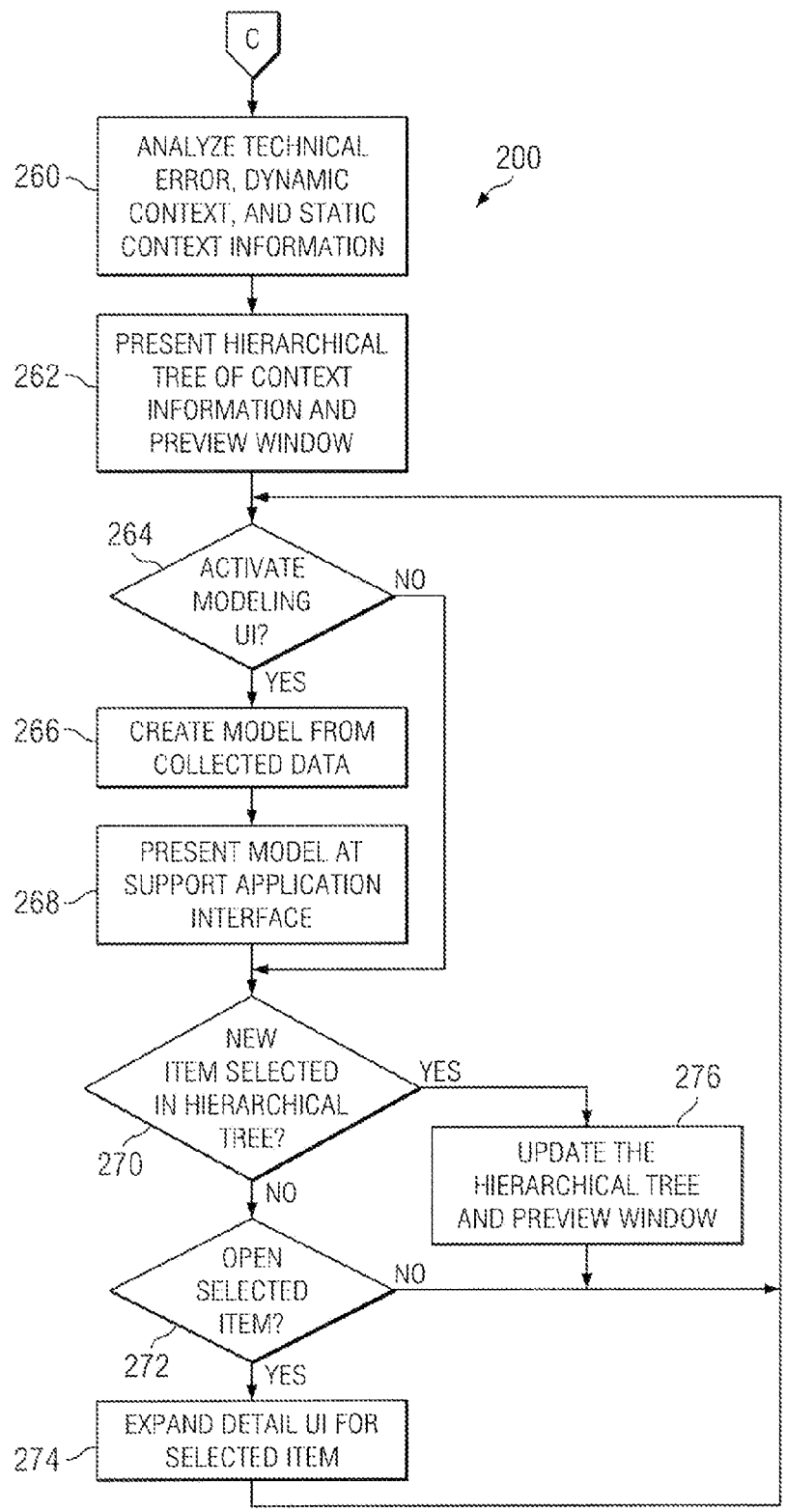

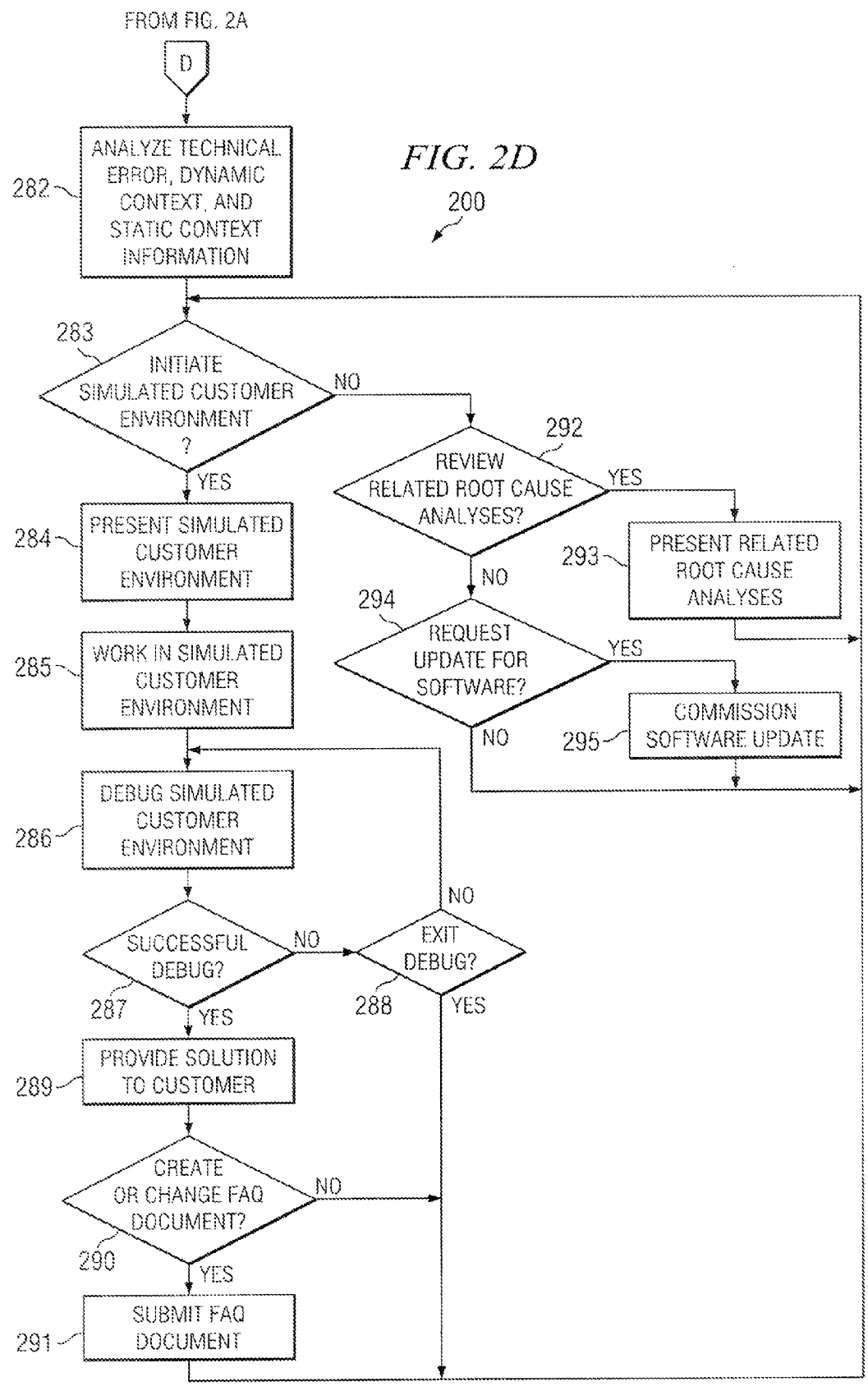

FIG. 3

Support Application - Microsoft Internet Explorer

Support Application

Incident 1000004711 Subject Wrong pricing for key accounts Status Open Requester Kate Jacob Reported On 03/08

301 | Save | Cancel | Print ▾ | New ▾ |

| Incident Details | Solutions | Context Analysis | Customer Factsheet | Root Cause Analysis |

Status ☐

Initial reaction time 03/14 — 12:34:34 am
Max processing time 03/16 — 12:34:34 am     310
Action plan time 03/15 — 12:34:34 am

Internal Notes ☐

03/13  Lorem ipsum dolor sit amet, consectetuer
adipiscing elit, sed diam nonummy nibh euismod tincidunt     316
ut laoreet dolore magna aliquam.

Incident Data ☐

Priority:   High
Contact:   Kate Jacob     315
Category:  Sales
ISV:       none
Release:   1

Incident Description ☐

Language English ▾   | Response ▾ |

Hello, the pricing procedure for our key customers does not work correctly,
the discount is not considered. Can you please help urgently? Best
Regards, Kate Jacob, Sales Key User, Akron Heating     320

Attachments ☐

📄 document_2.pdf   03/13   Kate Jacob     325
📄 document_1.html  03/13   Kate Jacob

Technical Error Information ☐

• Error Location: _____     317
• Error Message: _____

Assigned Solutions ☐

No solutions assigned.     330

Text Log ☐

_____
_____
_____
Go to... ▾

| Close | New ▾ | Actions ▾ |    Incident Details  Solutions  Context Analysis  Customer Factsheet  Root Cause Analysis

300

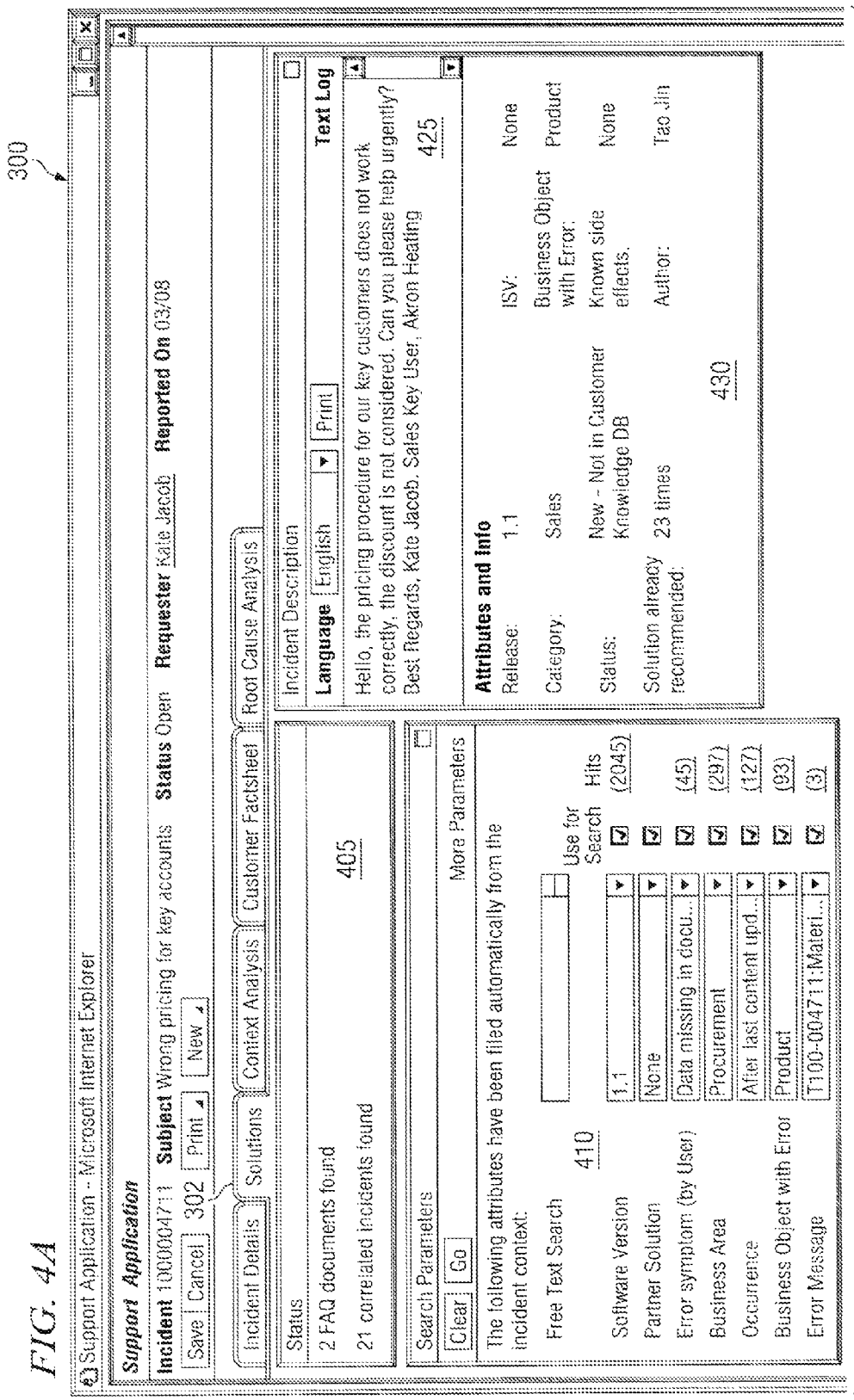

Solution Search (23 Hits)

[Add solution to incident] [Print]

The following notes match your search parameters:

| Correlation Index | Subject | Status | Document Type | Implement Info | Add Info |
|---|---|---|---|---|---|
| 92% | Pricing error in purchasing document | In progress | Correlated Incident | Not in cust. DB | New - of in customer DB |
| 89% | Pricing: Creation of discounts | Released | FAQ Document | Already found by customer | Top Note - frequ recomm |
| 89% | Pricing: Creation of discounts | Released | FAQ Document | Already found by customer | Top Note - frequ recomm |
| 89% | Pricing: Creation of discounts | Released | FAQ Document | Already found by customer | Attention-side effects |

← 415

[Open full Screen]

Search history

The customer already performed searches using the following search path in the Incident Wizard:

1. Functionality is missing (45) -> I see data in my Work Center, but I cannot change or perform certain actions on them (34) -> display Pricing of Sales Order -> the requested operations is prohibited by the system settings.

2. Data are missing -> I am missing business objects in my work list which my colleague...

← 420

FROM FIG. 4A

*FIG. 4B*

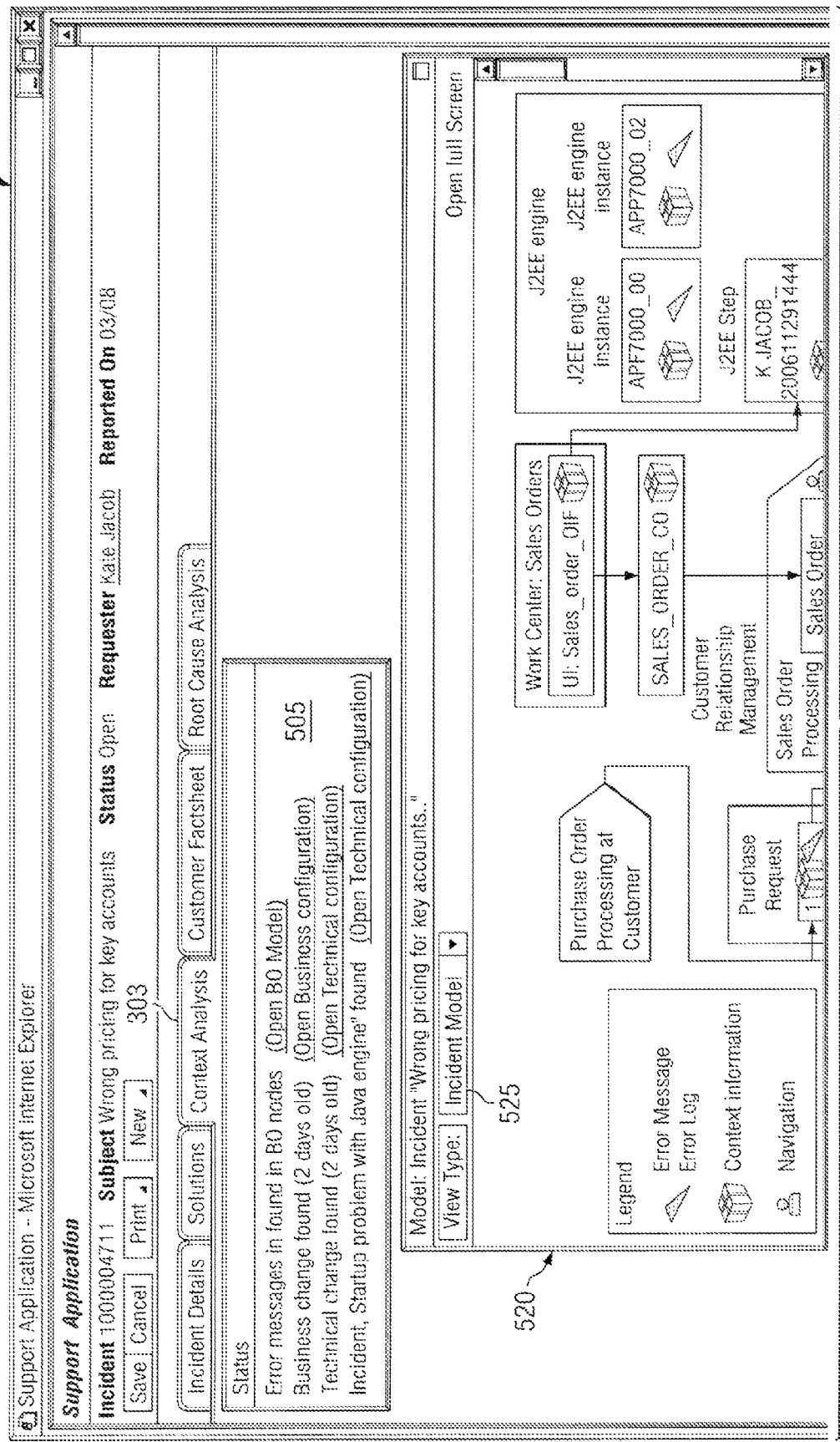

FROM FIG 5A-1

Context Analysis from 03/08

Show [All Objects ▼]  Open [Open graphical display ▼] 512  Open full Screen

Generate new | Print

The following context information have been found in the incident context.

510

| Name | Type | Errors | Context |
|---|---|---|---|
| ▼ Incident 100000004711 "Pricing has not been collected correctly" (User incident) | Inc | | X |
| ▼ Customer Relationship Management | DU | | |
| ▼ Sales Order Processing | PC | X | |
| ▼ Sales Order 4711 | BO | | X |
| ▼ Business Object Nodes | | | |
| ▼ Item 1 | Node | | X |
| ▶ Schedule Line 1 | Node | | X |
| ▶ Schedule Line 2 | Node | | X |
| ▼ Item 2 | Node | | X |
| ▼ Transaction Steps | | | |
| ▶ KJACOB 20061211 12342.1123 | TS | | X |
| ▶ Incident 100000004623 "Error in Process Component Requirement Processing in | Inc | X | X |
| ▶ Incident 100000004824 "Startup problem with Java VMC engine" | Inc | X | X |

Details: Sales Order 4711

Errors [All Messages ▼]

515

| Messages | Date and Time | Severity | Source |
|---|---|---|---|
| QUERY_BY_ELEMENTS returned with 0 records | 03/13 10:23:12 | Info | SALES_ORDER/ROOT |

*FIG. 5A-2*

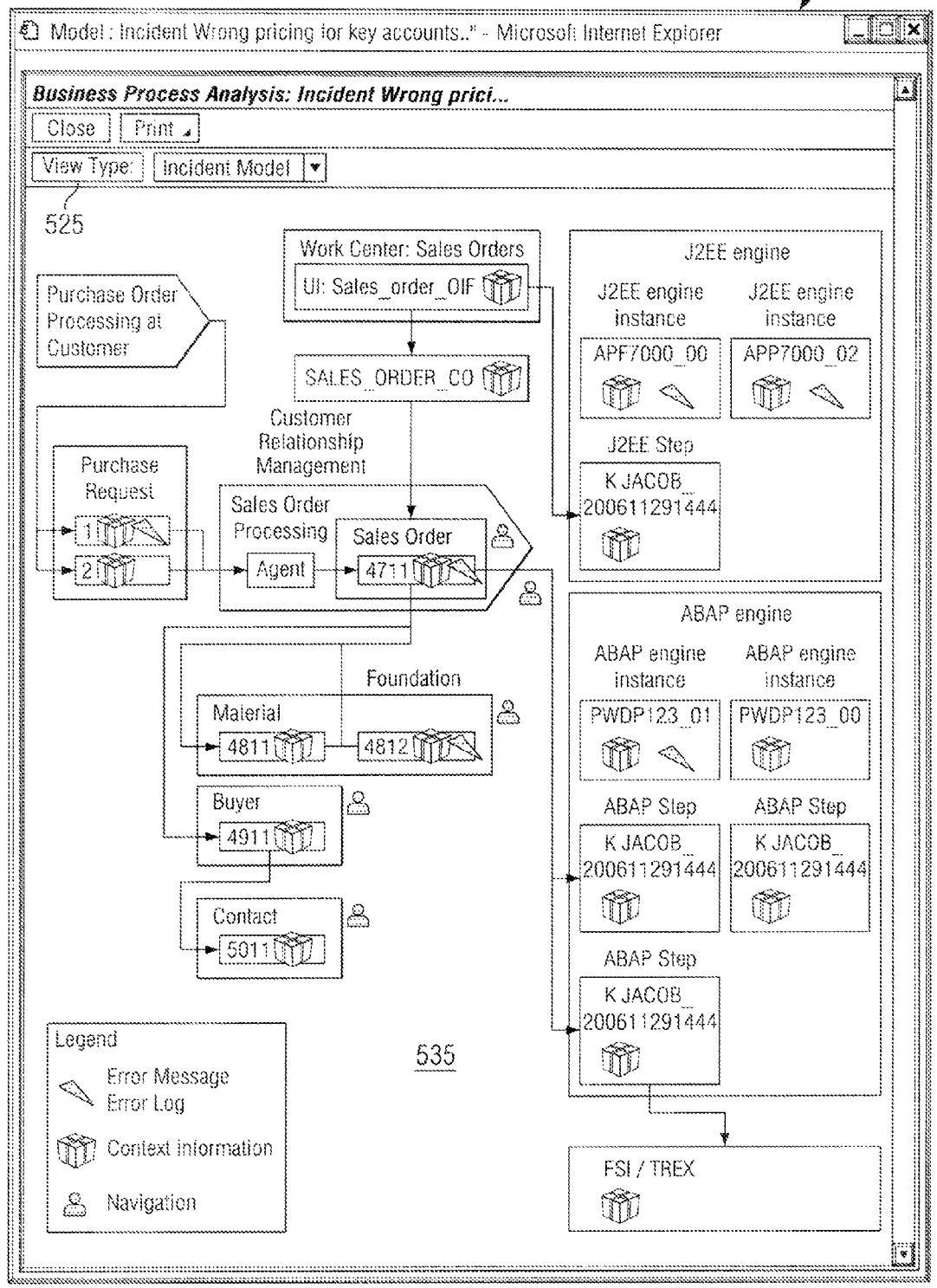

*FIG. 6*

*Support Application - Microsoft Internet Explorer*

*Support Application*

Incident 100030471 Subject Wrong pricing for key accounts Status Open Requester Kate Jacob Reported On 03/08

Save | Cancel | Print ▲ | New ▲
304

| Incident Details | Solutions | Context Analysis | Customer Factsheet | Root Cause Analysis |

Status
Skill set of customer is below average (Open skill set report)
605

Customer Data
Customer Name: Akron Heating                Sales Contact:           Acme America - SMB
Contact Person: Jeff Goldblume               Service Contact:         Jeff Goldblume
Service Partner: Acme Hosting                Service Partner Contact: Satia Rao

610

Service History

| Date  | Subject | Status | Document Type |
|-------|---------|--------|---------------|
| 03/03 | Message error in interface Purchase Order process... | In progress | Incident |
| 03/03 | Start up problems with Java engine | Closed | Incident |

615

Close | New ▲ | Actions ▲

Incident Details   Solutions   Context Analysis   Customer Factsheet   Root Cause Analysis          Go to... ▲

SYSTEM AND METHOD FOR SUPPORTING SOFTWARE

TECHNICAL FIELD

This application relates to software support and, more particularly, to servicing, administering, or otherwise supporting business applications.

BACKGROUND

Organizations and businesses depend on software deployed throughout their computing infrastructures to perform tasks relevant to their respective fields. As these entities begin using more enterprise software solutions, enterprise-wide software support becomes a necessary corollary to the software itself, as technical issues and performance errors may inevitably arise during the software's normal operations. For example, a customer may experience technical errors affecting the operations of the current software. In some support solutions, the customer may be required to submit or report the error through a manual process. Upon receiving the error report or notice, the support provider may manually analyze the error, diagnose the problem, and determine the proper solution. Once found, the support provider may relay the solution to the customer, who may then attempt to implement the steps of the provided solution. In some of these situations, such as those involving a customer support phone hotline, the customer generally needs a rudimentary level of knowledge regarding the software to ensure that the dialog between the technical consultant and the customer is clear enough to allow for a successful resolution to the issue.

In other support solutions, a searchable knowledge base may be provided. Thus, when an error occurs, the customer may manually search a listing of provided solution documentation for common errors that may occur within the software application. For more robust software applications, the related knowledge base may include multiple levels of solutions, requiring significant time and effort by customers to find, and then decipher, the correct solution. Even after locating a suitable solution, implementing the steps may be too difficult for customers without advanced knowledge of or access to the application. In some situations, the support provider may offer a help desk where customers may submit a ticket describing an error. The ticket may be reviewed by an employee of the solution provider, who then analyzes the error and attempts to provide solutions.

The set of current support solutions normally require both customers and support providers to manually generate potential solutions. Thus, customer support requires time- and resource-consuming actions. Some errors may occur frequently, giving the support provider the experience necessary to quickly solve the customer's error. Other errors, however, may occur much less frequently, thus prompting the support provider or the customer to spend larger amounts of time searching for relevant solutions.

SUMMARY

This disclosure provides various embodiments of software for supporting a business application. In one aspect, the software receives error information and dynamic context information from a remote business application, where the dynamic context information may partially identify the particular execution point of the business application and a portion of the business data associated with that execution point. The software may then present a search interface to a support user utilizing search criteria that is automatically populated using the received information, and, upon request of the support user, generate an execution environment that simulates the remote business application execution using the received information. In some implementations, the software is further operable to retrieve static context information related to the remote business application from a static context information repository. In those instances, the execution environment for the support user may be generated using at least a portion of the retrieved static context information.

While generally described as software, some or all of these aspects may be further included in respective systems or other devices for executing, implementing, or otherwise supporting a suitable software application. The details of these and other aspects and embodiments of the disclosure are set forth in the accompanying drawings and the description below. Other features, objects, and advantages of the present disclosure will be apparent from the description and drawings, and from the claims.

DESCRIPTION OF DRAWINGS

FIG. 2B is a flowchart further illustrating one example of supporting a business application using a method for receiving, analyzing, and providing solutions within the illustrated environment of FIG. 1A;

FIG. 2C is a flowchart further illustrating another example of supporting a business application using a method of displaying, interacting with, and using the context data provided within the illustrated environment of FIG. 1A;

FIG. 2D is a flowchart, further illustrating yet another example of supporting a business application using a method of root analysis using the context data available within the illustrated environment of FIG. 1A;

FIG. 3 illustrates one embodiment of the incident details tab of the support application provided to the client of the illustrated environment of FIG. 1A:

FIGS. 4A-4B illustrate one embodiment of the solutions tab of the support application displaying the solutions in the illustrated environment of FIG. 1A;

FIGS. 5A-1-5A-2 illustrate one embodiment of the general view of the context analysis tab of the support application in the illustrated environment of FIG. 1A;

FIG. 5B illustrates one embodiment of an expanded view of the modeling user interface provided in the general view of the context analysis tab of the support application within the context of FIG. 5A;

FIG. 6 illustrates one embodiment of the customer fact sheet tab of the support application displaying a particular set of information regarding a specific customer provided to the client of the illustrated environment of FIG. 1A.

DETAILED DESCRIPTION

Figure 1A:
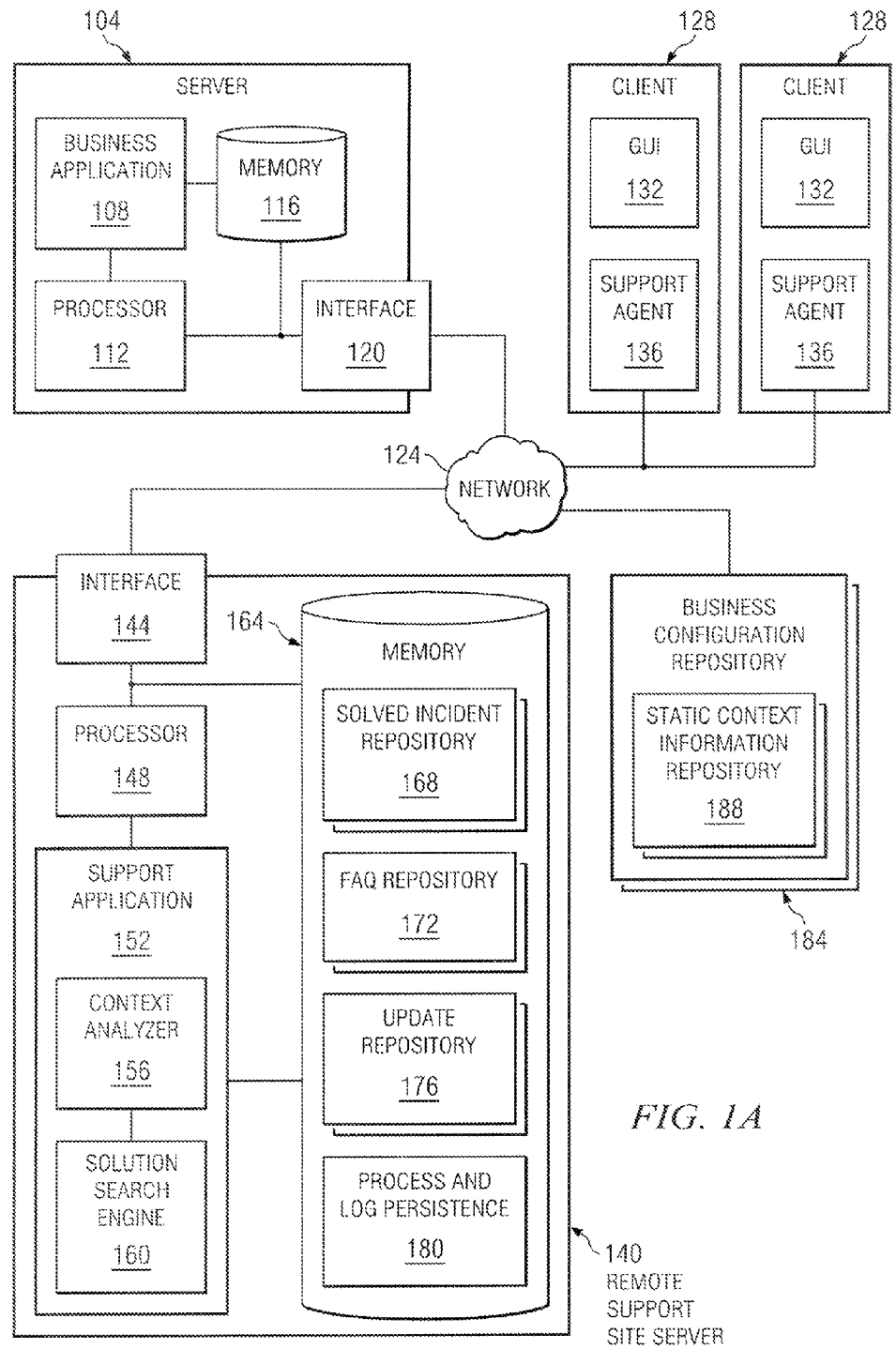
FIG. 1A illustrates a distributed software environment that supports a business application according to a particular implementation of the present disclosure.

FIG. 1A illustrates at least a portion of an enterprise or data processing environment 100 implementing or facilitating the technical support of a business application 108. In accordance with particular implementations, illustrated environment 100 utilizes the business application 108 running within a server 104 in communication with a support application 152 located at a remote support site server 140 in order to provide support to clients 128 running an instance of the business application 108. The present disclosure provides a system and method for supporting the business application 108, giving the solution provider and the client 128 the ability to interact in a more precise and productive manner than in prior solutions. The proffered solution allows for customers and the support provider to review, at one location, the technical error that has occurred, and dynamic and static context information regarding the particular customer's environment at the time of the error, as well as other information relevant to the technical error. In addition to this data, the present disclosure may allow support providers and customers to search detailed stores of solutions used in similar situations, determine the progress of the solution, and analyze the root cause of the technical error received. By providing the relevant information and tools for the support of the business application 108 in one location, the present disclosure allows a support provider to give its customers enhanced support services, while reducing the costs inherent to the support process.

Turning to FIG. 1A, environment 100 may include or be communicably coupled with the server 104, one or more clients 128, a network 124, the remote support site server 140, and a business configuration repository 184. Servers 104 and 140 include memory 116 and 164, as well as one or more processors 112 and 148, respectively, and comprise electronic computing devices operable to receive, transmit, process, store, or manage data associated with the system. Generally, this disclosure provides merely one example of computers that may be used with the disclosure. As used in this document, the term "computer" is intended to encompass any suitable processing device. For example, the environment 100 may be implemented using computers other than servers, as well as a server pool. Indeed, either of or both server 104 and remote support site server 140 may be adapted to execute any operating system including Linux, UNIX, Windows Server, or any other suitable operating system. According to one embodiment. either server 104 or server 140 may also include or be communicably coupled with a web server and/or a mail server.

Memory 116 and 164 may include any memory or database module and may take the form of volatile or non-volatile memory including, without limitation, magnetic media, optical media, random access memory (RAM), read-only memory (ROM), removable media, or any other suitable local or remote memory component. For example, memory 116 and 164 may store classes, frameworks, applications, backup data, jobs, or other information that includes any parameters, variables, algorithms, instructions, rules, or references thereto. The memory 116 and 164 may also include any other appropriate data such as VPN applications, firmware logs and policies, firewall policies, a security or access log, print or other reporting files, HTML files or templates, and others.

Specifically; memory 116 may include business data that can be utilized by the business application 108. As illustrated, memory 164 contains four specific data stores: a solved incident repository 168, a Frequently Asked Questions (FAQ) repository 172, an update repository 176, and a process and log persistence 180. While illustrated within memory 164 in FIG. 1A, each of the data stores illustrated in FIG. 1A may be located outside the memory 164 and the remote support site server 140 in other embodiments. The solved incident repository 168 may store a plurality of errors that occur during the operation of business application 108 and a plurality of solutions related to those errors. The plurality of solutions may be provided by the support provider, and in some embodiments, by customers who successfully solved a technical error related to the business application 108 and submitted the solution. In some instances, more than one solution may exist for a single error stored in the solved incident repository 168. The solved incident repository 168 may be organized using various keys such as the screen of the business application 108 where the error occurred, the particular module or location within business application 108 where the error occurred, and the application related to the error, as well as other discernable categories. In some embodiments, the solved incident repository 168 may be implemented by a plurality of repositories, each specific to a particular business application 108 or portions thereof. One remote support site server 140 may be the support site for a plurality of applications 108, and the support application 152 may access the particular repository corresponding to the error of the current situation. In addition to the errors and related solutions, the solved incident repository 168 may include metrics or other information associated with each solution such as the solution's relative success or failure rate, ratings measuring the ease of enacting a particular solution, or any other suitable metric.

The FAQ repository 172 stores a plurality of FAQ documents. These FAQ documents may include, among other types of documents, step-by-step solutions to common technical errors, suggestions regarding analysis and identification hints specific to common problems faced by customers, or suggestions written by other customers who have faced similar issues. The documents in the FAQ repository 172 may provide customers with a general set of help documents that may be searched through the use of key words or other search criteria and reviewed for potential solutions or suggestions. In some embodiments, the process and log persistence 180 may keep track of the documents from the FAQ repository 172 that the customer has reviewed. In this manner, the support provider may choose to omit the previously-viewed FAQ's from any future recommendations provided to the customer. Documents within the FAQ repository 172 may also be associated with metrics and other reported information, such as comments from customers and support personnel, to provide additional relevant information to the customers and support personnel accessing the repository 172.

The update repository 176 includes a list of the current updates available for each software application supported by the support application 152. During a search of the solved incident 168 and FAQ repositories 172, the support application 152 may compare the static context information associated with the business application 108 to determine whether the application 108 or related software may have an available update. If an update is available, the support application 152 may request that, prior to further actions, the customer or support personnel update the identified system and subsequently attempt to replicate the error. In this manner, the techniques described herein can help identify technical errors caused by incompatibilities with outdated software or fix those errors with newer updates to the software. Errors that remain after the application 108 and related software have been updated may be further examined using the other portions of the support application 152.

The process and log persistence 180 stores information relating to the actions of the customer and support personnel prior to, during, and after using the support application 152. The persistence 180 may log messages generated during the analysis of the incident context created by a context analyzer 156. Additionally, the process and log persistence 180 may log the search activities of the customer or support personnel. For instance, persistence 180 may keep a log of the FAQ documents reviewed by the customer prior to the support personnel's intervention in the solution process. By logging the documents reviewed, the support personnel may be able to provide solutions other than those included in the FAQ document, creating a more efficient solution process by limiting the redundancy of the solutions offered by the support provider, in addition to the FAQ documents, the persistence 180 may also log the search criteria used by the customer or support personnel to search the memory 164 and any results provided by the search. The persistence 180 may log root cause analysis results and activities such that other support personnel may review the data. This may provide valuable information to support personnel that allows errors analyzed and solved in one environment to help solve errors occurring in a second environment. Further, the process and log persistence 180 consumes and persists warnings and alerts from the context analyzer 156 and the solution search engine 160 of the support application 152. In still other instances, the process and log persistence 180 may log and report status information on the progress of the solution process, providing the information for progress indicators presented at the GUI 132 on the client 128.

Another data store, the business configuration repository 184, may also be present within the environment 100. In the specific embodiment of FIG. 1A, the business configuration repository 184 is shown external to the remote support site server 140 and memory 164. In other instances, the business configuration repository 184 may be stored internal to memory 164 among the other data stores. Regardless of its location within the environment 100, the business configuration repository 184 provides a centralized location for storing business configuration data that may make up the backbone of the environment 100. Specifically, the business configuration repository 184 may include a static context information repository 188. This static context information repository 188 may store static information relating to the clients 128, business applications 108, and servers 104 of the environment 100. Some examples of the information collected in the static context information repository 188 may include the customer type, the type of client 128, the release or version of the specific business application 108, contractual limitations or requirements of the client 128 or server 104, service levels of the associated customer, and other information that remains relatively static in the normal course of operations. Some of the static context information may be collected the first time a particular client 128 accesses the business application 108 or the network 124 in general, in some of those embodiments, a support agent 136 at the client 128 may collect particular static context data and provide the information to the static context information repository 188 for storage. In other embodiments, the information may be retrieved by the business application 108 at certain intervals during operation. Of course, static information may change over time or in response to certain events (such as a pricing increase, change in licensing terms, employee turnover, software or equipment upgrades, etc.), but are generally stored at the business configuration repository 184 as such information may span (or apply to) a multitude of errors. When one of these errors occurs, the error information, dynamically determined context information, and the static context information may be combined to find appropriate solutions within the solved incident repository 168 or FAQ repository 172. In other instances, the business configuration repository 184 may include business configuration data other than the static context information repository 188.

Illustrated servers 104 and 140 also include processors 112 and 148, respectively. Each processor executes instructions and manipulates data to perform the operations of the associated server such as, for example, a central processing unit (CPU), a blade, an application specific integrated circuit (ASIC), or a field-programmable gate array (FPGA). Although described as a single processor in the servers 104 and 140, multiple processors 112 and 148 may be used according to particular needs, and references to processor 1.12 and 148 are meant to include multiple processors where applicable. In this particular illustration, processor 112 executes the business application 108, while processor 148 executes the support application 152.

Figure 1B:
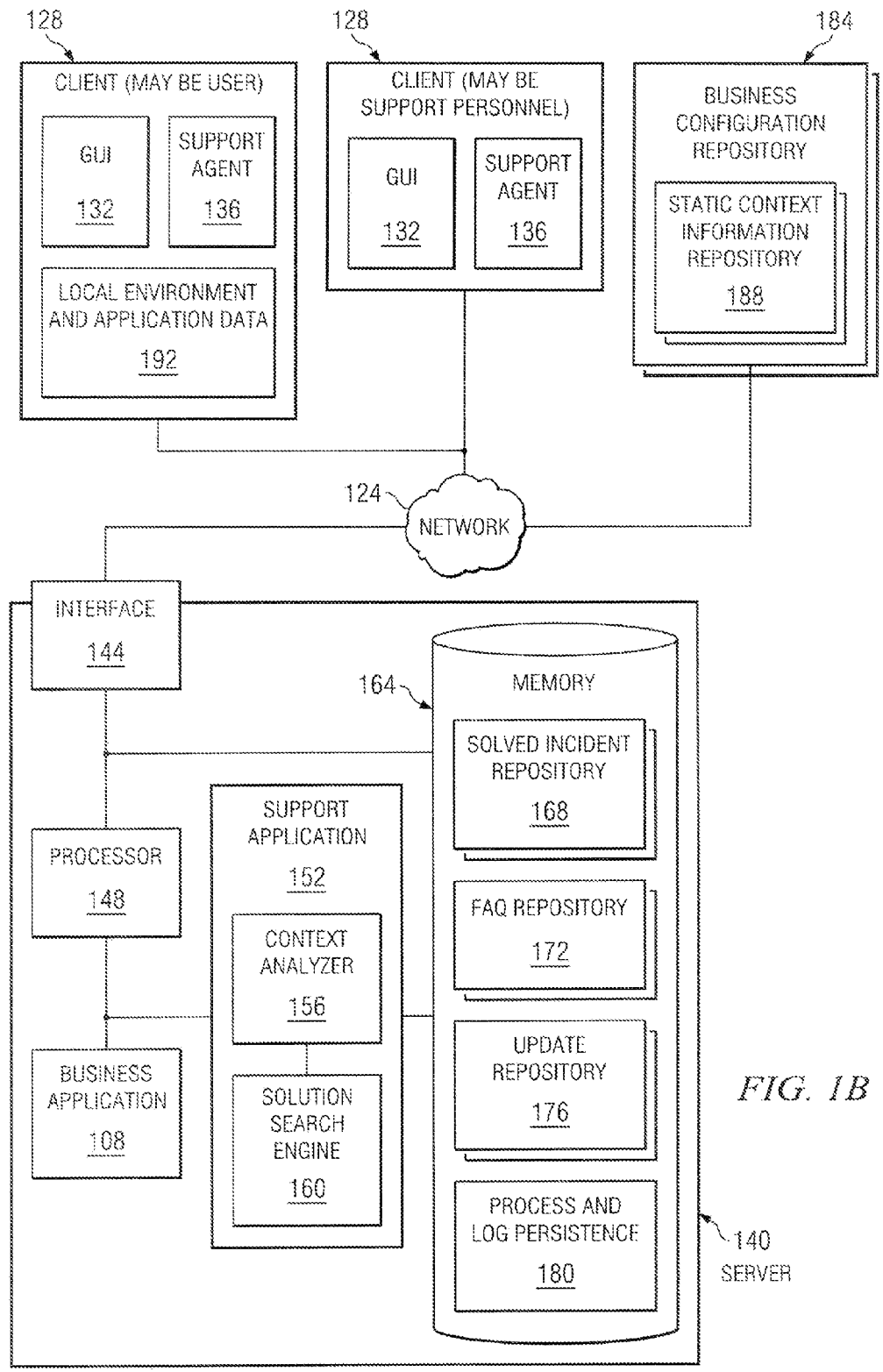
FIG. 1B illustrates a hosted software environment that supports a business application according to another implementation of the present disclosure.

At a high level, business application 108 is any application, program, module, process, or other software that may execute, change, delete, generate, or otherwise manage business information, according to the present disclosure. In certain cases, environment 100 may implement a composite application 108. For example, portions of the composite application may be implemented as Enterprise Java Beans (EJBs) or design-time components may be have the ability to generate run-time implementations into different platforms, such as J2EE (Java 2 Platform, Enterprise Edition), ABAP (Advanced Business Application Programming) objects, or Microsoft's .NET. Further, while illustrated as internal to server 104, one or more processes associated with application 108 may be stored, referenced, or executed remotely. For example, a portion of application 108 may be a web service that is remotely called, while another portion of application 108 may be an interface object bundled for processing at remote client 128. Moreover, application 108 may be a child or sub-module of another software module or enterprise application (not illustrated) without departing from the scope of this disclosure. Indeed, as shown at FIG. 1B, application 108 maybe a hosted solution that allows multiple parties in different portions of the process to perform the respective processing. For example, client 128 may access business application 108 on server 104, or even as a hosted application located over network 124, without departing from the scope of this disclosure. In another example, portions of business application 108 may be used by the customer working directly at server 104, as well as remotely at client 128. In yet another example, business application 108 may be hosted by a third party relatively unrelated to either the customer (represented in this case as client 128) or the service provider (represented in this case as server 140). Additionally, the client 128, the business application 108, and the support application 152 may be controlled by these different parties.

More specifically, business application 108 may be a composite application, or an application built on other applications, that includes an object access layer (OAL) and a service layer. In this example, application 108 may execute or provide a number of application services such as customer relationship management (CRM) systems, human resources management (FIRM) systems, financial management (FM) systems, project management (PM) systems, knowledge management (KM) systems, and electronic file and mail systems. Such an object access layer is operable to exchange data with a plurality of enterprise base systems and to present the data to a composite application through a uniform interface. The example service layer is operable to provide services to the composite application. These layers may help composite application 108 to orchestrate a business process in synchronization with other existing processes (e.g., native processes of enterprise base systems) and leverage existing investments in the IT platform. Further, composite application 108 may run on a heterogeneous IT platform. In doing so, composite application 108 may be cross-functional in that it may drive business processes across different applications, technologies, and organizations. Accordingly, composite application 108 may drive end-to-end business processes across heterogeneous systems or sub-systems. Application 108 may also include or be coupled with a persistence layer and one or more application system connectors. Such application system connectors enable data exchange and integration with enterprise sub-systems and may include an Enterprise Connector (EC) interface, an Internet Communication Manager/Internet Communication Framework (ICM/ICF) interface, an Encapsulated PostScript (EPS) interface, and/or other interfaces that provide Remote Function Call (RFC) capability. It will be understood that while this example describes the composite application 108, it may instead be a standalone or (relatively) simple software program. Regardless, application 108 may also perform processing automatically, which may indicate that the appropriate processing is substantially performed by at least one component of system 100. It should be understood that this disclosure further contemplates any suitable administrator or other user interaction with application 108 or other components of environment 100 without departing from its original scope.

Support application 152, executed by processor 148, may be any application, program, module, process, or other software that may implement or execute the support functions and processes according to the present disclosure. Support application 152 may also include the capabilities to access, query, change, delete, generate, or otherwise manipulate the elements within memory 164, including the solved incident repository 168, the FAQ repository 172, the update repository 176, and the process and log persistence 180. In certain embodiments, support application 152 may be able to communicate with the business application 108 in order to send and receive relevant support information. Also, when present at client 128, support agent 136 may be communicably coupled with the support application 152 using asynchronous or synchronous communications. For example, agent 136 may monitor client 128 and, upon detecting an error, send the error and various business data to the support application 152. In another example, agent 136 may detect a change in client 128, such as a hardware upgrade, and communicate a change in such relatively static information. Indeed, support agent 136 may be operable to send any amount of business data to support application 152, often upon request. Further, while illustrated as internal to the support site server 140, one or more processes associated with support application 152 may be stored, referenced, or executed remotely. For example, a portion of application 152 may be a web service that is remotely called, while another portion of the application 152 may be an agent, such as the support agent 136, bundled for processing at remote client 128. Moreover, application 152 may be a child or sub-module of another software module or enterprise application (not illustrated) without departing from the scope of this disclosure, hi some embodiments, the support application 152 may be communicably coupled to a billing system, perhaps part of the business application. In other situations, the billing system may comprise a third party billing application or distributor. When support personnel spend time using the support application 152, the billing system may be notified and may keep track of the time spent working for the customer. In some instances, the billing system may charge per incident, per time spent working, or any other method of calculating the support. In still other instances, various levels of support may be included with the contract between the customer and support provider. In those cases, the billing system may still keep track of the time spent working for the customer so that various metrics, such as billable support time, may be kept. In some situations, the billing system may automatically process and aggregate the various support times, generate bills, and electronically forward the bills to the customers or debit the customer's account.

As illustrated in FIG. 1A, the support application 152 includes two specific components: the context analyzer 156 and a solution search engine 160. In some instances, the components may be embedded within the support application 152, while in other instances, the components maybe communicably coupled to the support application 152. The components may be agents or modules running on server 140 that receive information from the business application 108, client 128, business configuration repository 184, or other component within or external to the environment 100 illustrated in FIG. 1A. In some instances, the context analyzer 156 and the solutions search engine 160 may he implemented as a single component that combines the capabilities of the two. Other components providing additional or supplemental functionality may also exist within the support application 152.

Specifically, the role of the context analyzer 156 is to read and analyze the technical error and dynamic context information provided by the business application 108 and the support agent 136, and static context information retrieved from the static context information repository 188, in addition to other relevant information provide to the support application 152. Upon analyzing the information, the context analyzer 156 may perform a number of tasks, hi one instance, the context analyzer 156 may analyze the combination of information and, using the functionality of the support application 152, the network 124, and the GUI 132 located at the client 128, display the analyzed data into a readable and usable format. Customers and support personnel may review the information through the GUI 132 at the client 128 to help find possible solutions to the technical error. For example, the analyzed information may he portrayed by a business process view, a business object view, a business configuration view, or a system landscape view. The different views support the customer by displaying the analyzed context and error data for efficient and complete analysis of the specific problem experienced by the customer. In some instances, the analyzed information from the context analyzer 156 may be used by the support application 152 to generate a simulated business application 108 environment. By generating this model, support personnel may review the business application 108 at the time of the error, as well as the interactions throughout the environment 100 that may have led to the error's occurrence.

The context analyzer 156 may also provide the analyzed information to the solution search engine 160. The solution search engine 160 may consume the analyzed context information and generate relevant parameters for a search of the solved incident repository 168, the FAQ repository 172, and the update repositories 176. The search of the solved incident repository 168 may provide solved incidents of identical or similar technical errors experienced by other customers from which solutions to the present error may be realized. The search of the FAQ repository 172 may provide a set of relevant FAQ documents describing similar errors or problems that may help to solve the present issue. Further, the search of the update repository 176 may determine whether the business application 108 and other software is up-to-date, ensuring that version incompatibilities are not causing the technical error. Using the static context information, the solution search engine 160 may query the update repository 176 to determine whether newer versions of the software exist. If the software may be updated, the support application 152 may provide feedback to the customer or support personnel at the GUI 132, requesting that the software be updated. Once updated, the business application 108 may be run again to determine whether the update cured the errors previously received. In addition to update requests, the solution search engine 160 and the support application 152 may provide the results of the search to the customer or support personnel at client 128. That data may be reviewed by the support personnel or customer, and the results may be evaluated to determine whether their contents help solve the technical error.

Servers 104 and 140 may include interfaces 120 and 144 for communicating with other computer systems, such as clients 128, or each with other over the network 124, in a client-server or other distributed environment. Generally, interlaces 120 and 144 comprise logic encoded in software and/or hardware in a suitable combination and operable to communicate with the network 124. More specifically, interfaces 120 and 144 may comprise software supporting one or more communications protocols associated with communications such that the network 124 or hardware is operable to communicate physical signals.

The network 124 facilitates wireless or wireline communication between the server 104 and any other local or remote computer, such as the clients 128. Indeed, while illustrated as one network 124, network 124 may be a discontinuous network without departing form the scope of this disclosure, so long as at least a portion of network 124 may facilitate communications between senders and recipients. The network 124 may be all or a portion of an enterprise or secured network. In some instances, a portion of the network 124 may be a virtual private network (VPN) merely between the server 104 and the client 128 across a wireline or wireless link. Such an example wireless link may be via 802.11a, 802.11b, 802.11g, 802.20, WiMax, and many others. In other words, the network 124 encompasses any internal or external network, networks, sub-network, or combination thereof operable to facilitate communications between various computing components in the system. The network 124 may communicate, for example, Internet Protocol (IP) packets, Frame Relay frames, Asynchronous Transfer Mode (ATM) cells, voice, video, data, and other suitable information between network addresses. The network 124 may include one or more local area networks (LANs), radio access networks (RANs), metropolitan area networks (MANs), wide area networks (WANs), all or portion of the global computer network known as the Internet, and/or any other communication system or systems at one or more locations. In certain embodiments, the network 124 may be a secure network associated with the enterprise and certain local or remote clients 128. In the present environment 100 of FIG. 1A, the server 104, the remote support site server 140, and the business configuration repository 184 are connected by the network 124.

The client 128, illustrated in FIG. 1A, may be any computing device operable to connect or communicate with server 104, server 140, or the network 124 using a wireline or wireless connection. At a high level, each client 128 includes at least the GUI 132 and, in some cases, the support agent 136, and comprises an electronic computing device operable to receive, transmit, process, and store any appropriate data associated with the business application 108 and the support application 152. It will be understood that there may be any number of clients 128 communicably coupled to the server 104. For example, the clients 128 may include two local clients, as illustrated in FIG. 1A, as well as other clients external to the illustrated portion of the network 124. Further, "the client 128," "analyst," and "user" may be used interchangeably as appropriate without departing from the scope of this disclosure. For example, the analyst may access a first instance of the business application 108 on a first client 128, while an end user may use a second instance of the business application 108 on a second client 128. Moreover, for ease of illustration, each client 128 is described in terms of being used by one user. But this disclosure contemplates that many users may use one computer or that one user may use multiple computers. As used in this disclosure, the client 128 is intended to encompass a personal computer, touch screen terminal, workstation, network computer, kiosk, wireless data port, smart phone, personal data assistant (PDA), one or more processors within these or other devices, or any other suitable processing device. For example, the client 128 may comprise a computer that includes an input device, such as a keypad, touch screen, mouse, or other device that can accept information, and an output device that conveys information associated with the operation of the server 104 or the clients 128, including digital data, visual information, or the GUI 132. Both the input device and output device may include fixed or removable storage media, such as a magnetic computer disk, CD-ROM, or other suitable media to both receive input from and provide output to users of the clients 128 through the display, namely, the GUI 132.

In FIG. 1A, at least some of the clients 128 include the support agent 136. The support agent 136 may be an agent, daemon, object, service, or other software that is reactive to certain events occurring with respect to the client 128. The support agent 136 may intercept error messages, signals, and events concerning the related client 128, or the client 128 may actively supply the support agent 136 with notification of and data regarding the error. In some embodiments, the support agent 136 may determine, based on the error event, the specific technical error, or instead, a code or other marker indicating a certain error has occurred. In other embodiments, the support, agent 136 may receive a report from the client 128 describing the error. Additionally, the support agent 136 may analyze or retrieve a set of dynamic context information regarding the client 128 and the business application 108 at the time of the error. Such information may include the particular screen the client 128 was on at the time of the error, the particular machine type of the client 128, and other information that may vary at different instances during operation of the business application 108. As described above, multiple clients 128 may use the business application 108 in the current environment 100. Therefore, the clients 128 and the other computers accessing the business application 108 may have different specifications and software that are relevant to the technical issues experienced. Thus, the support agent 136 may collect, this dynamic context information, in addition to any error information, and provide the information to the support application 152 for further action. Moreover, support agent 136 may provide or facilitate the presentation of potential solutions via GUI 132.

GUI 132 comprises a graphical user interface operable to allow the user of the client 128 to interface with at least a portion of environment 100 for any suitable purposes such as to allow the client 128 to interact with the business application 108 and, in the event of a technical error, provide an interface with the support application 152 to help support the business application 108. Generally, the GUI 132 provides the client 128 with an efficient and user-friendly presentation of data provided by or communicated within the system. In particular, GUI 132 may provide the user of business application 108 with access to data stored within memory 116. The GUI 132 may comprise a plurality of user interface (UI) elements such as interactive fields, pull-down lists, and buttons operable at the client 128. These UI elements may be associated with support functions provided by the support application 152 and the business application 108 for requesting or receiving information related to support of the business application 108. In one embodiment, the GUI 132 may display a list of solutions generated by the solution search engine 160 and organized by the support application 152. In other embodiments, the GUI 132 may provide an interactive display of the context information provided to the support application 152 when a technical error is reported by the business application 108. In still other embodiments, the GUI 132 may display a list of potential solutions and links to FAQ documents, possibly leading the customer or support personnel to solving the technical error. Moreover, it should be understood that the term graphical user interface may be used in the singular or in the plural to describe one or more graphical user interfaces and each of the displays of a particular graphical user interface. Therefore, the GUI 132 contemplates any graphical user interface, such as a generic web browser, touch screen, or command line interface (CLI) that processes information in environment 100 and efficiently presents the results to the user. The server 104 can accept data from the client 128 via the web browser (e.g., Microsoft Internet Explorer or Mozilla Firefox) and return the appropriate HTML or XML responses using the network 124.

In other implementations (as shown in FIG. 1B), the business application 108, the support application 152, and the memory 164 storing the solved incident repository 168, the FAQ repository 172, the update repository 176, and the process and log persistence 180, may be managed by a single provider, as illustrated by the server 140, perhaps as a hosted solution. Notably, the business application 108 and support application 152 may communicate through the internal connections of the server 140. Additionally, at least a portion of the error and context information related to the technical error at the business application 108 that was sent via the network 124 from the client 128 to the support application 152 in FIG. 1A, may instead be communicated internal to the server 140 of FIG. 1B. Clients 128 may still contain the support agent 136 and connect to the server 140 via the network 124. In such a hosted environment, the client 128 may log in to the remote server 140 and run the business application 108 from a web browser or other similar interface. When an error is reported by or to the support agent 136, the error information and the dynamic context information of the client 128 is sent to the support application 152 communicably coupled to the business application 108. Clients 128 may include a set of local environment and application data 192 specific to each instance of the client 128. This information may be included with the error and dynamic context information associated with the business application 108, as well as the static context information stored at the business configuration repository 184, to provide a complete and accurate set of data to the support application 152. The support application 152, using the context analyzer 156 and the solution search engine 160, may then analyze and present the relevant information to the customer and/or support personnel at the client 128 through the GUI 132.

FIGS. 2A-D provide a series of flowcharts illustrating an example process 200 of supporting the business application 108 with the support application 152, as illustrated in FIG. 1A. At step 202, the support application 152 receives technical error and dynamic context information from the support agent 136 at the client 128 and/or the business application 108. The information may be received at interface 144 of server 140 and communicated to the support application 152 via the internal connections of remote support site server 140. Based on the information received at step 202, the support application 152 may retrieve related static context information from the static context information repository 188 at step 204. Once this static context information is retrieval by the support application 152, a support application interlace 300 (illustrated in FIG. 3) may be generated at step 206 that will be displayed at the GUI 132 of the client 128. In the current example, the interface 300 may provide live separate, but related, tabs through which the customer and/or support personnel may review and analyze the relevant data. The five tabs of the illustrated environment 100 of FIG. 1A include an incident details tab 301, a solutions tab 302, a context analysis tab 303, a customer feet sheet tab 304, and a root cause analysis tab 305. In some instances, the incident details tab 301 may be the default tab shown initially upon startup.

To create the incident details tab 301, the support application 152 organizes the technical error, dynamic context, and static context information into a usable format at step 208. This may include parsing through the data to create an XML file with corresponding tags indicating the nature of the data, creating a spreadsheet or database in which the data is stored, or using another suitable organizational method. Once the data is organized, then at step 210 the support application 152 may populate the support application interface 300 with at least a portion of the technical error information received from the support agent 136 or business application 108. Referring to FIG. 3, the technical error information may be presented at element 317, as well as within other elements not illustrated in the present embodiment. These technical details may be included within the interface 300 such that support personnel may review the error codes or messages generated by the business application 108 at the time that the technical error occurred.

At step 212 of process 200, the support application 152 may populate the support application interface 300 with at least some of the parameters generated by the context analyzer 156 from the dynamic and static context information. Referring again to FIG. 3, these parameters may be presented in the incident data element 315. There, information such as the customer's contact and category, the version of the software, as well as other relevant data, may be displayed. In general, this information may provide the customer and/or the support personnel with an overview of the situation at the time the error occurred. Thus, the incident details tab 301 may act as a summary situation when the particular technical error was received. Other data sets may also be included within the incident details tab 301. For instance, at step 214, the support application 152 may populate a text log 320 including notes supplied by the customer and/or support personnel during the solution process. The notes may be stored in the process and log persistence 180 such that communications between the customer and support personnel may be kept and reviewed. Using the text log 320, support personnel may also store notes regarding other contacts with the customer. Therefore, all notes may be stored in a single location. When the incident context tab 301 is first generated, the text log 320 may be empty. As messages are sent and received, the text log 320 may grow. In some instances, the text log 320 may be initially populated by one or more messages sent by the customer through the business application 108 or support agent 136. In those instances, the business application 108 or the support agent 136 may provide a text box or other UI immediately upon the error's occurrence such that the customer may explain the error and the error's effect on the operations of the business application 108.

Several additional elements are present in FIG. 3 that may be included with the present embodiment. In some instances, documents relating to the technical error and incident overall may be available to the customer and/or the support personnel. In order to keep information in one location, at step 216 the support application 152 may receive and attach these related documents to the incident context tab 301 such that links to the documents are available at element 325 of FIG. 3. These documents may include screenshots of the business application 108 at the time the error occurred, documents illustrating the expected result of a fully-functioning application, and other documents related to the error. Additionally, the support application interface 300 may provide an input field for internal notes 316. At step 218, these internal notes 316 may be received by the support application 152 and stored in the process and log persistence 180. By storing the internal notes 316, the support application 152 may provide an ongoing set of notes developed by the customer and/or the support personnel. When attempting to solve the technical error, the parties may leave notes reminding themselves of scheduled tasks, completed tests, and other solution-related information. Further, the support application interface 300 may include a solution status element 310 for displaying information on the status of the solution process. In the present embodiment, the status of the process may include the initial reaction time of the support application 152, the maximum time for the application 152 to process the information, and the planned time for action. Other values indicating an estimated solution time, as well as the progress made in the solution, may be included with the solution status element 310. Also, the incident details tab 301 may include a set of solutions 330 that have been assigned to the current incident. Because not every solution may succeed in solving the problem, assigned solutions 330 may be tracked to ensure that a solution that has failed to work will not be assigned again. This list of solutions 330 may include links to FAQ documents, solved incident documents, or other solution items, such that the customer and/or support personnel may review the previously attempted solutions at their convenience. Thus, the incident details tab 301 provides an overview of the solution process, the technical errors, and the progress of the solution process.

The second of the five tabs illustrated in the present disclosure is the solutions tab 302. Steps 202, 204, and 206 of FIG. 2A collect the relevant data and generate the support application interface 300. Upon completing these steps, process 200 continues to the steps illustrated in FIG. 2B. Additionally, FIGS. 4A-4B provide an illustrated example of the solutions tab 302. At step 224, the support application 152 analyzes the technical error, dynamic context, and static context information using the context analyzer 156. As described, the context analyzer 156 of the support application 152 reads and analyzes the information received from the business application 108 and the support agent 136, as well as static context information retrieved from the static context information repository 188. In analyzing the information, the context analyzer 156 may parse the information into usable parameters, and provide the parsed information to the solution search engine 160.

Using the analyzed information, the support application 152 may retrieve the customer's search history from the process and log persistence 180 at step 226. The search history may include FAQ documents the customer has reviewed, solved incidents that have been viewed, as well as other searches and results already performed during the solution process. By retrieving this information before querying the relevant repositories, the solution search engine 168 may signify in the returned results, or omit entirely, the solutions and documents that may have already been reviewed by the customer. Therefore, redundancy in the results may be avoided, and only those results that will further the solution process may be provided.

Once the solution search engine 160 is supplied with the appropriate search parameters and the search history has been retrieved, the search engine 160 may automatically query the solved incident repository 168 and FAQ repository 172 for possible solutions at step 228. In some instances, other relevant data stores and databases may be searched as well. Based on certain criteria, each solution or document may be returned with a correlation index or other value indicating the likelihood that the returned item matches the search criteria. Once a set of potential solutions and relevant FAQ documents are returned, the support application 152 evaluates the results and the context information and compares the values with the data of the update repository 176. The update repository 176 stores current updates available for the business application 108 and the other software of the system. The comparison of the context information and the update repository 176 may determine whether an update is available for a specific application related to the current error. If, at step 232, it is determined that an update is available, then at step 234 the updates may be installed. In some instances, a notice may be sent to the customer as notification of the available update. Because incompatibility with the outdated system may be the cause of the errors, the support application 152 may require the business application 108 or other software to be updated prior to continuing. In some examples, the updates may be made by the support application 152 itself the support personnel, or the customer. Once the software is updated, the business application 108 and other software may be run again in situations similar to those which first generated the error, in order to determine whether the update cured the previous errors.

If, however, the determination at step 232 indicates that business application 108 and other software are up-to-date, then process 200 may continue to step 236, where the support application 152 populates the support application interlace 300 with the results of the search. The support, application 152 may also populate the interface 300 with the customer's search history. Therefore, where solutions or documents already viewed by the customer are omitted by the solution search engine 168 in its search of the repositories, links to or copies of the omitted solutions or documents may still be provided. At step 238, the support application 152 determines whether one of the possible solutions is selected by the customer or support personnel as the solution to the technical error. Where one of the solutions is selected, process 200 moves to step 240. There the solution maybe enacted by the support personnel or, in some instances, by the customer after receiving a notification that a solution has been identified and selected. During this process, the support application 152 may ensure that the process and log persistence 180 stores the search results and selected solutions for future review. Additionally the selected solution and the associated information, such as the context and error data, may be stored within the solved incident repository 168 so that they are available to future searches.

Where none of the returned solutions is selected, process 200 may continue to step 242, where it may be determined whether the customer or support personnel have entered a manual search. If a manual solution is entered, the user may manipulate the search criteria to those desired. Some examples of the parameters that may be used in a search include the version of the business application 108, the error symptoms experienced by the customer, and the business area of the application 108 where the error occurs, among others. Once the manual search criteria have been added, the support application 152 may ran the query, returning to process 200, to step 228. On the other hand, if no manual search is entered, then the support application 152 may notify support personnel that further review and additional work may be necessary to develop an independent solution to the technical error. This additional review may include independent testing, as well as a review of the client 128 on which the customer was interacting when the error occurred.

FIG. 4A illustrates the solutions tab 302 as described in process 200. Specifically, the solutions tab 302 includes a search progress field 405, a search parameters field 410 for manual searches, a solution search results list 415, a search history list 420, a text log field 425, and a solution attribute field 430. The search progress field 405 provides a brief summary of the automatic search's results. In the illustrated example, the search has returned two FAQ documents and twenty-one solved incidents. The solution search results list 415 provides a more detailed listing of the documents and solutions returned by the search. The search results may be displayed in table form, as shown in FIGS. 4A-4B, or in any other form suitable for customer and support personnel review. In the current embodiment, the results are automatically presented when the support application interface 300 is generated, and the list 415 includes fields for the correlation index, the subject and status of the document or solved incident, the document type of the returned value, and relevant implementation information of the result. As described above, the correlation index may be a value computed by a predetermined algorithm used to determine the relative likelihood that a particular search result satisfies the search parameters. Initially, the documents and solutions may be sorted by their correlation index. However, the customer and/or support personnel may be able to change the field on which the table's values are sorted by selecting different fields within the list 415. The status of the FAQ document or solved incident indicates whether the item has been finalized or is still a work in progress. Even if the document is still considered to be in progress, it may still be valuable to the customer and/or support personnel in that it may provide a lead to determining a proper solution. The document type field notifies users as to whether the document was retrieved from the solved incident repository 168, the FAQ repository 172, or another location. The implementation information field may provide additional information as to whether the customer and/or support personnel have located or retrieved the document in earlier searches. This may assist the parties in determining whether a solution is new to the problem by providing a notification as to whether it has already been reviewed. Although not illustrated in FIG. 4, in some instances when a specific solution from the solution search result list 415 is selected, a separate window may be opened to allow for a review of the document's contents. In other instances, the contents of the document, or a preview thereof, may be provided in an additional element of the solutions tab 302. Thus, users may be able to review the provided solution without initializing another application.

The search history list 420 provides a listing of previous searches entered by the customer. Previous searches may be stored in the process and log persistence 180 such that the list reflects a history of searches performed by the customer. In some instances, the results of these previous searches may be available to review via hyperlink, while in others the searches may be rerun by selecting the search listing. Thus, the customer and/or support personnel may review the searches performed by the customer. In some situations this may provide the support personnel with a general idea as to where to begin their investigation. In other situations, the search history may remind customers of the information that has already been reviewed, thus avoiding redundant searches.

The text log field 425 may be similar to the text log 320 of FIG. 3. Texts stored in the process and log persistence 180 may be displayed within the solutions tab 302 such that notes and comments of the customer and support personnel may be kept in a single location. This may allow multiple support personnel to work on the same incident without overlapping actions being taken.

Further, solutions tab 302 includes a solution attribute field 430 providing more specifics regarding the currently selected solution of the solution search results list 415. In some instances, the attributes included in the field 430 may be high-level information regarding the document such as the software release it refers to, the category it relates to, or the author of the solution, while in other instances, the field may provide a detailed description of the solution. In some instances, the solution attribute field 430 may include a value for the number of times the specific solution has already been recommended to other customers' incidents. Additionally, certain metrics associated with the particular solution, such as success rate, maybe included in the attribute field 430.

When a user elects to perform a manual search, the search parameters field 410 offers a selection of relevant parameter fields. The parameters may include the software version, partner solution, error symptom, and error message, among others. In addition to the parameters provided in the search parameters field 410, a free text search field may be available to perform a text search across all fields within the documents and solutions. Once the parameter values have been entered, the user may initiate the search, and the returned solutions may be provided in the solution search results list 415. Additionally, once a manual search has been run, the search progress field 405 values may change to reflect the results of the new query.

Returning to FIG. 2A, the third tab created by the support application 152 is the context analysis tab 303. Similar to the other tabs, information about the technical error and the dynamic and static context information are gathered at steps 202 and 204, and at step 206, the support application interface 300 is generated. Upon performing these steps, process 200 moves to step 260 shown in FIG. 2C. There the context analyzer 156 analyzes the technical error, the dynamic context information, and static context information. As described above, the context analyzer 156 reads and analyzes the information received from the business application 108 and the support agent 136, as well as static context information retrieved from the static context information repository 188. Using the analyzed information from the context analyzer 156, the support application 152 organizes and presents a hierarchical tree formed by combining the technical error and context information at step 262. The hierarchical tree may display the details of the incident context in a readable format, such as a table. Additionally, the support application 152 presents a preview window associated with the hierarchical tree capable of presenting a preview of information related to the selected item of the hierarchical tree. When the hierarchical tree is first presented, one item may be initially selected as the default item. In some instances the default item may be the first item listed in the hierarchical tree, while in others it may be the first item associated with an error. The default item may be initially selected in the hierarchical tree, and its details may be displayed in the preview window.

FIGS. 5A-1-5A-2 illustrate the context analysis tab 303 as presented in one instance of the support application interface 300. The context analysis hierarchical tree 510 for one set of context information and technical error information is illustrated therein. As shown, the technical error, along with the various nodes of the business application 108 and the related system, are presented in the hierarchical tree 510. Included with the items listed in the tree 510 is some basic information relating to the item. Within the example embodiment of FIGS. 5A-1-5A-2, the information includes the item type or role, an entry indicating whether a technical or other error is associated with the item, and an entry indicating whether context data is available regarding the item. By selecting any of the items within the hierarchical tree 510, detailed data may be populated in the preview window 515. In some instances, the data populated in the preview window 515 may include error data relevant to the selected item, the context data of the selected item, or the item's various attributes.

Returning back to FIG. 2C, support application 152 provides additional functionality to the present disclosure. At step 264, the support application 152 determines whether to activate a modeling user interface (UI) within the support application interface 300. The support application 152 may use signals provided to the GUI 132 by the customer or support personnel indicating that the modeling UI should be activated. For instance, a button 512 in the context analysis tab 303 of FIG. 5A-1 may be present such that the modeling UI element 520 is generated when the button is activated. In other instances, the support application 152 may automatically activate the modeling UI element 520 without any prompting from the user. If the application 152 determines that modeling is not to be activated, then process 200 may continue to step 270. However, if it is determined that the modeling UI element 520 is to be activated, process 200 proceeds to step 266, where the support application 152 creates the model from the data analyzed by the context analyzer 156. Using the analyzed data, the support application 152 may generate a model of the customer system, including the business application 108, that provides an illustration of the connections and nodes within the system, where errors occurred and were received, and other details regarding the environment 100. In various instances, the modeling UI element 520 generated may provide an incident model, a business process view, a business object view, and a business configuration view, in addition to other useful models. Using the view type selection 525, the customer and/or support personnel may select one of the available modeling views which is to be shown in the UI element 520. The view type selection 525 may be a drop-down box, checkbox, or another suitable input allowing users to choose between one or more options. The modeling UI element 520 may be related to the hierarchical tree 510 such that when a specific item is selected, the modeling UI element 520 may focus or center the view on that item.

In some instances, the modeling UI element 520 may be expanded to provide a larger view, and, in some cases, a full screen view of the model. This expanded modeling UI element 520 is illustrated in FIG. 5B. Included with the model is a legend providing the user viewing the UI element 520 with an understanding of the various items illustrated in the model. In some embodiments, the figure may include an icon indicating where in the system an error message was received. Thus, when reviewing the model, the customer and/or support personnel may easily identify the items or nodes of the system that are not operating correctly. Other attributes and context data may be included in the model UI element 520 in other instances. The customer and/or support personnel may select the modeling view to be shown in the UI element 520 by changing the selection within the view type selection 525.

Returning to FIG. 2C, once the model is presented at the support application interface 300, then at step 270 it may be determined whether a new item has been selected in the hierarchical tree 510. If a new item has been selected, the hierarchical tree 510 and preview window 515 may be updated at step 276. Updating the hierarchical tree 510 may involve changing the table highlighting to indicate which item is currently selected. In other instances, updating the hierarchical tree 510 may also include expanding the newly selected item to show the related sub-items at levels underneath the selected item. Updating the preview window 515 may involve displaying a preview of information related to the newly selected item. In some instances, the modeling UI element 525 may also be updated at step 276 to focus or center on the newly selected item. Once the update is complete, process 200 may return to step 264.

Figure 5C:
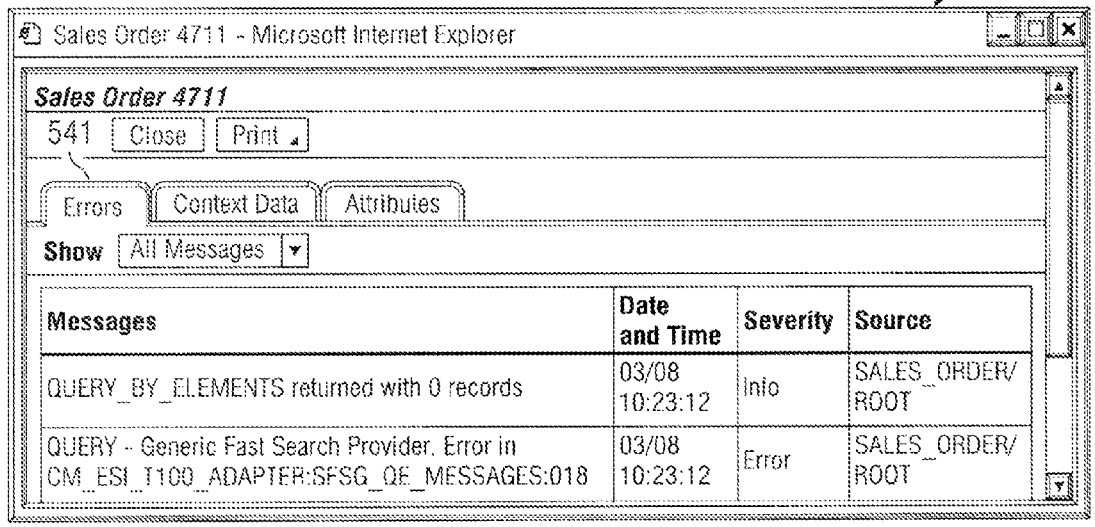
FIGS. 5C-5E illustrate one embodiment of a set of detailed views for a particular node of the plurality of nodes provided in the general view of the context analysis tab of the support application within the context of FIGS. 5A-1 and 5A-2.
Figure 5E:
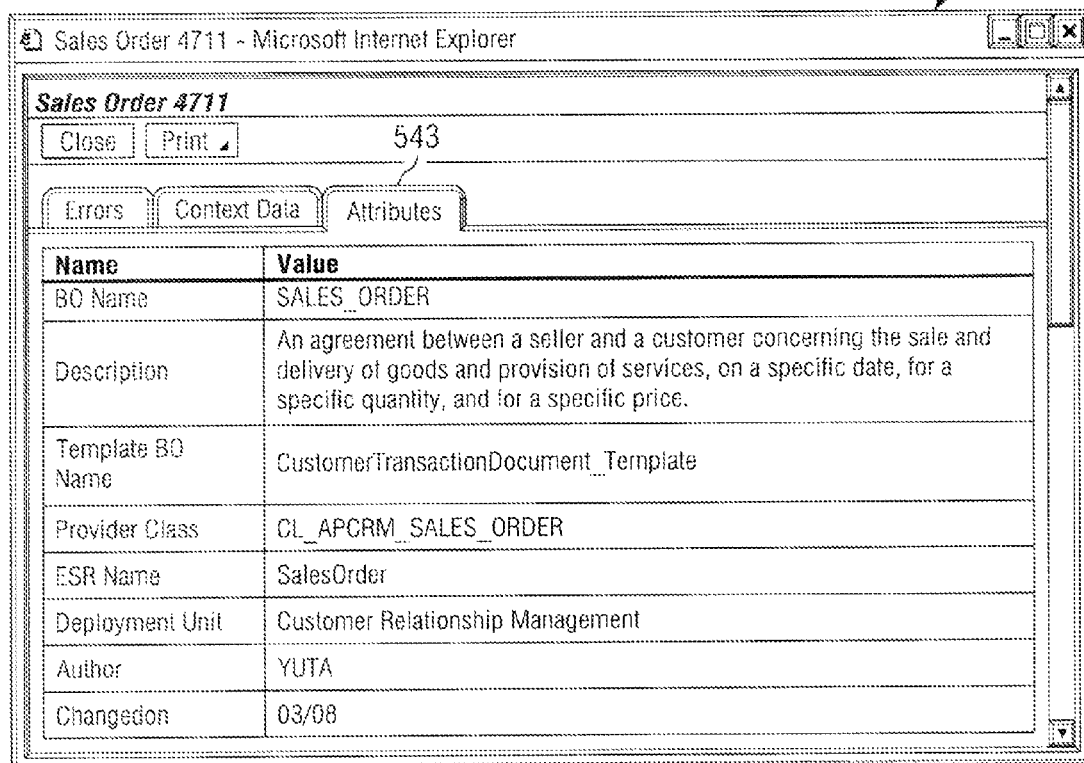
Figure 5D:
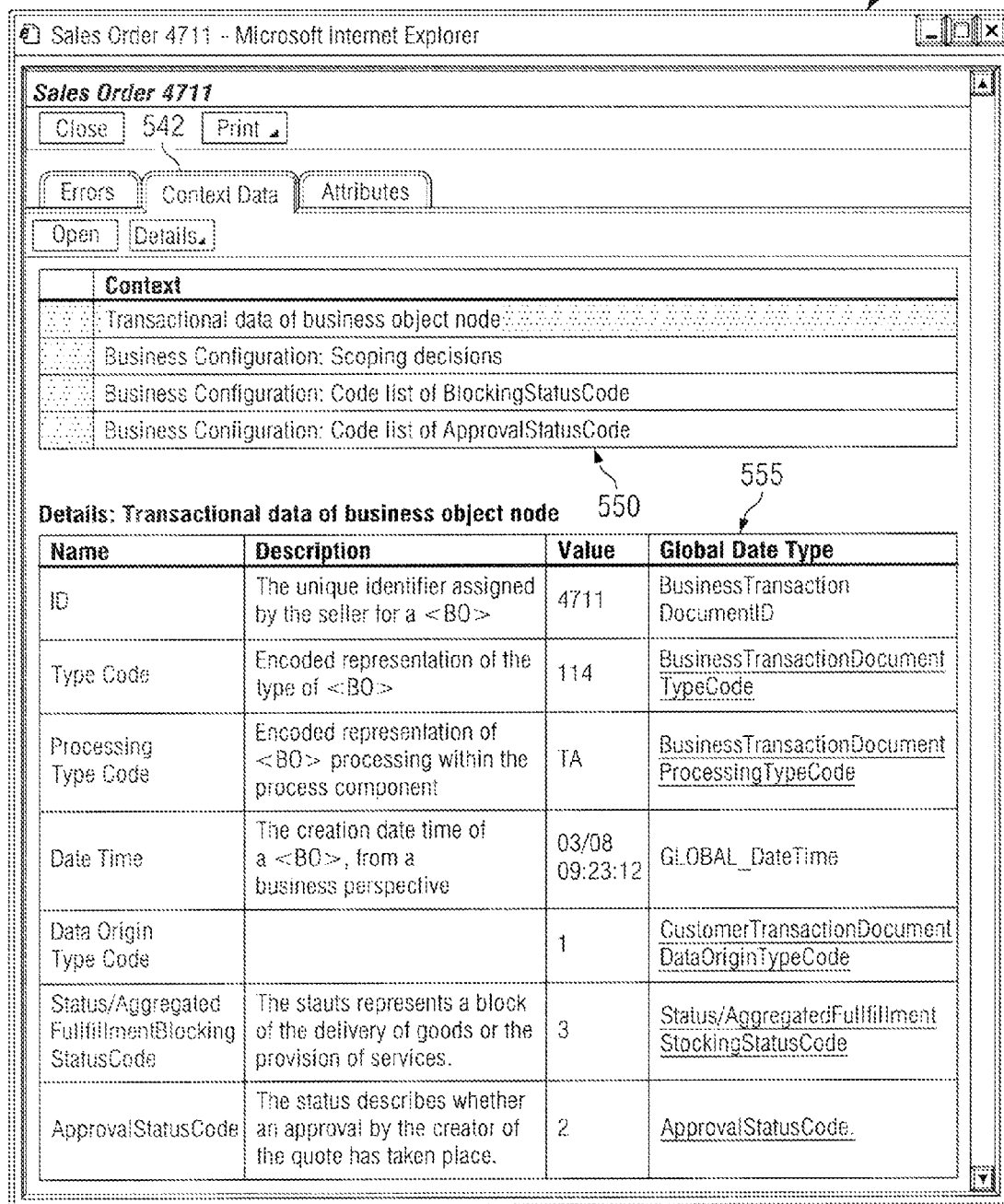

Returning to step 270, if a new item has not been selected, then at step 272 the support application 152 may determine whether a detailed description of the currently selected item should be opened. In some situations, the customer or support personnel may indicate that the selected item should be opened by double-clicking on the selected item. In other situations, the user interacting with the support application interface 300 may activate a button or other input that causes the item's detailed description to be opened. If the support application 152 determines that the selected item is not to be opened, process 200 may return to step 264. However, if it is determined that the selected item is to be opened, then at step 274 the support application 152 may open a detailed description UI 540 for the selected item. FIGS. 5C-E illustrate one embodiment of a particular item's detailed description UI 540. In some instances, the detailed description UI 540 may include one or more individual tabs organizing the detailed information of the selected item. In the present example, the detailed description UI 540 contains three organized tabs: an error tab 541, a context data tab 542, and an attribute tab 543. Users may navigate between these views by clicking on the desired tab. FIG. 5C provides an example of the detailed description's error tab 541. At this screen, errors or error messages that were received at or by the item may be listed. Included may be the date and time of the error, the error's severity level, and the source of the error, among other relevant data. FIG. 5D illustrates the context data tab 542 of the selected item. In some instances, the context data tab 542 may be organized into two parts. In the current instance, the upper portion 550 shows the different content data packages that may be available for the selected item. For instance, the upper portion 550 shown in FIG. 5D contains one package with transaction data for a business object node and three packages with different configuration data that belong to this business object node. Selecting one of the packages may cause that package's context data to be displayed in the lower portion 555 of the context data tab 542. FIG. 5E illustrates the attribute tab 543 associated with the selected item. The attributes listed may include the set of data associated with the selected item, as well as any dynamic and/or static context data specific to the item. The attributes may be used to better explain the job and importance of the selected item. Once the customer and/or support personnel are finished reviewing the detailed description UI 540, the support application 152 may close the detailed description UI 540, and process 200 may return to step 264 for further operations.

Returning to FIG. 2A, the fourth tab of the support application interface 300 is the customer fact sheet tab 304. Once the customer fact sheet tab 304 is activated, the static context information, retrieved at step 204 and analyzed by the context analyzer 156, may be used to populate the support application interface 300 at step 280. In some instances, additional data from various data stores may also be retrieved and used to populate the interface 300 with relevant customer data. One example of the customer fact sheet tab 304 is illustrated in FIG. 6. Included is a status indicator 605 providing general information to those accessing the customer fact sheet tab 304. In some instances, the status indicator 605 may indicate the relative severity of the technical error to the customer's operations, the relative skill level of the customer, and any delays or issues experienced during the solution process. Additionally, messages regarding recent changes to the customer's system and new errors received may be identified in the status indicator 605. In the customer data table 610, data regarding the customer may be displayed. This information may include the customer's name, the main contact at the customer, information regarding the support provider's contract with the customer, and the customer's support contact at the support provider. In the service history display 615, the support application 152 may provide a listing of previous and currently pending issues experienced by the customer and submitted to the support application 152. This data may provide the support personnel with some context regarding the current error, such as how the error fits with the other errors. Knowing of other errors may provide a clue regarding the cause of the problem to the support personnel. In some instances, data regarding other incidents and errors may be reviewed by actively selecting the item in the service history.

Figure 2A:
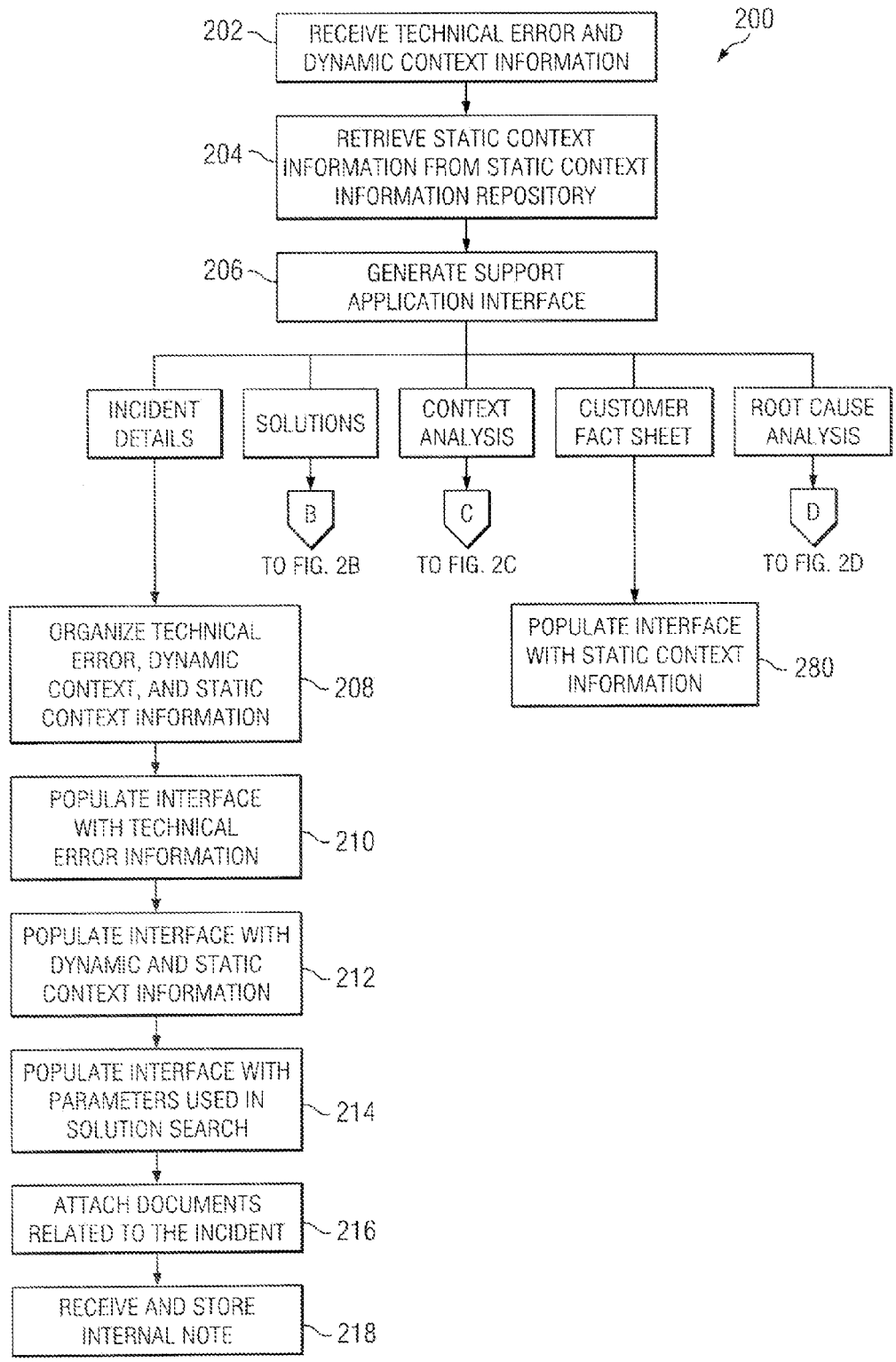
FIG. 2A is a flowchart illustrating an example of the steps for supporting a business application within the illustrated environment of FIG. 1A.

The root cause analysis tab 305 is the last of the tabs illustrated in the present embodiment. Similar to the other tabs described, steps 202 through 206 in FIG. 2A provide the preliminary actions of gathering the relevant information and generating the support application interface 300. The portion of process 200 relating to the root analysis tab 305 is illustrated in FIG. 2D. At step 282, the context analyzer 156 may analyze the technical error, the dynamic context, and the static context information. At step 283, the support application 152 determines whether the customer or support personnel have initiated a simulated customer environment. When the simulated customer environment is initiated, the support application 152 may present the simulated customer environment to the user at step 284. Using the data analyzed by the context analyzer 156, the support application 152 may create an execution environment similar to the customer's environment. The support application 152 may require some additional data from the customer's system in order to create a more realized operational simulation. In those cases, the support application 152 may request additional context and runtime information from the business application 108, the client 128, or the support agent 136. In many cases, the simulated customer environment may be run in a separate environment that is used by the customer. For example, the execution environment may be at least partially populated with data based on the customer's ID, but then utilize a temporary customer ID in the business application with the customer's data. By running this simulated environment apart from the customer's systems or accounts, changes made by the support personnel may not unintentionally affect the current settings and operations of the customer's applications.

At step 285, the support personnel may work in the simulated customer environment themselves in an attempt to replicate or reproduce the technical error. Because the connections, components, and settings in the simulated environment may be similar or identical to those of the customer environment, the technical error may occur when the same actions taken by the customer are taken by the support personnel. Once the error occurs, then at step 286, the simulated customer environment may provide an opportunity for the support personnel to debug the simulated system. In other instances, a debugging session may be run simultaneously with the simulated environment such that the information communicated between the nodes of the system is logged and the errors received are noted. By running the debugging session concurrently with the simulated environment, errors may be reviewed immediately when they occur, and the exact information transmitted at the time of the error may be analyzed. At step 287, the support application 152 determines whether the support personnel have successfully debugged the simulated environment. If they have not, process 200 may continue to step 288, where it is determined whether to exit the debugging process. Where the debugging process is not complete, process 200 may return to the debugging process at step 286. Once debugging is complete, process 200 may return to step 283. Turning back to step 287, if the debugging session is successful, then at step 289 the support personnel may provide the solution used in the simulated environment to the customer. This may involve communicating the steps of the solution to the customer via email or phone, while in other instances, it may involve opening a remote session to the customer's system. Using the remote session, the support personnel may themselves enact the solution discovered in the debugging session. The remote session may prove convenient to support personnel, in that customer errors may be avoided, especially in situations where the customer does not possess the technical skills necessary to take the steps of the solution.

Once the solution is provided, the support application 152 may determine whether the support personnel have created or changed an FAQ document in response to the new solution, at step 290. In some instances, it may be common practice for the support personnel to submit documentation of the error resolution. This documentation, as well as FAQ documents, may be submitted to the solved incident repository 168 and the FAQ repository at step 291. If, however, no FAQ documents are modified after providing the solution to the customer, then process 200 may return to step 283.

At step 283, if the support application 152 does not initiate a simulated customer environment, then process 200 may move to step 292. There, the support application 152 may determine whether the user has selected to review root cause analyses related to the current situation. If the support application 152 determines that a user intends to review them, then at step 293 the support application 152 may allow users to review root cause analysis documents and files associated with related technical errors, as well as root cause analyses previously performed for the current, situation. These files may include a previously recorded remote session where a solution is enacted on a customer's system, as well as communication and data traces from the simulated customer environment. Once the root cause analysis documents have been reviewed, process 200 may return to step 283.

If, at step 292, the support application 152 does not receive a signal that a user wants to review a root cause analysis, the process 200 may continue to step 294. Upon reaching step 294, the support personnel may have exhausted other options for solving the technical error. In those cases, the only solution may be to update the software upon which the error occurs. If the support personnel believe this to be the case, then a software update may be commissioned or requested at step 295. This request may be routed to the software developer, an entity of the support provider, another member of the support personnel, or any other party in charge of updating the software. Upon submitting the request, or if no update is requested at step 294, process 200 may return to step 283.

Figure 7A:
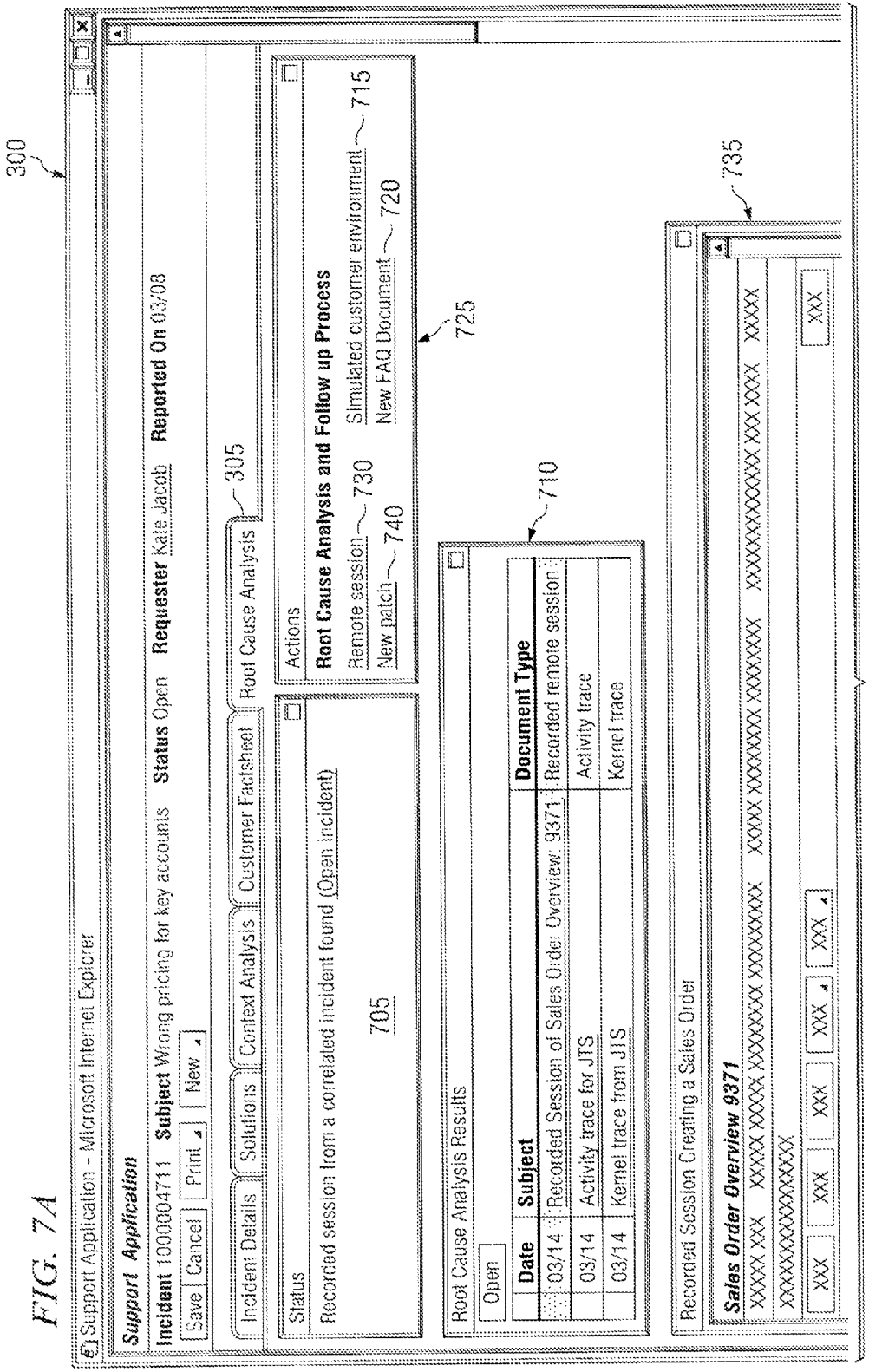
FIGS. 7A-7B illustrate one embodiment of the root cause analysis tab of the support application displaying an analysis of the root cause of the technical issue provided to the client of the illustrated environment of FIG. 1A.
Figure 7B:
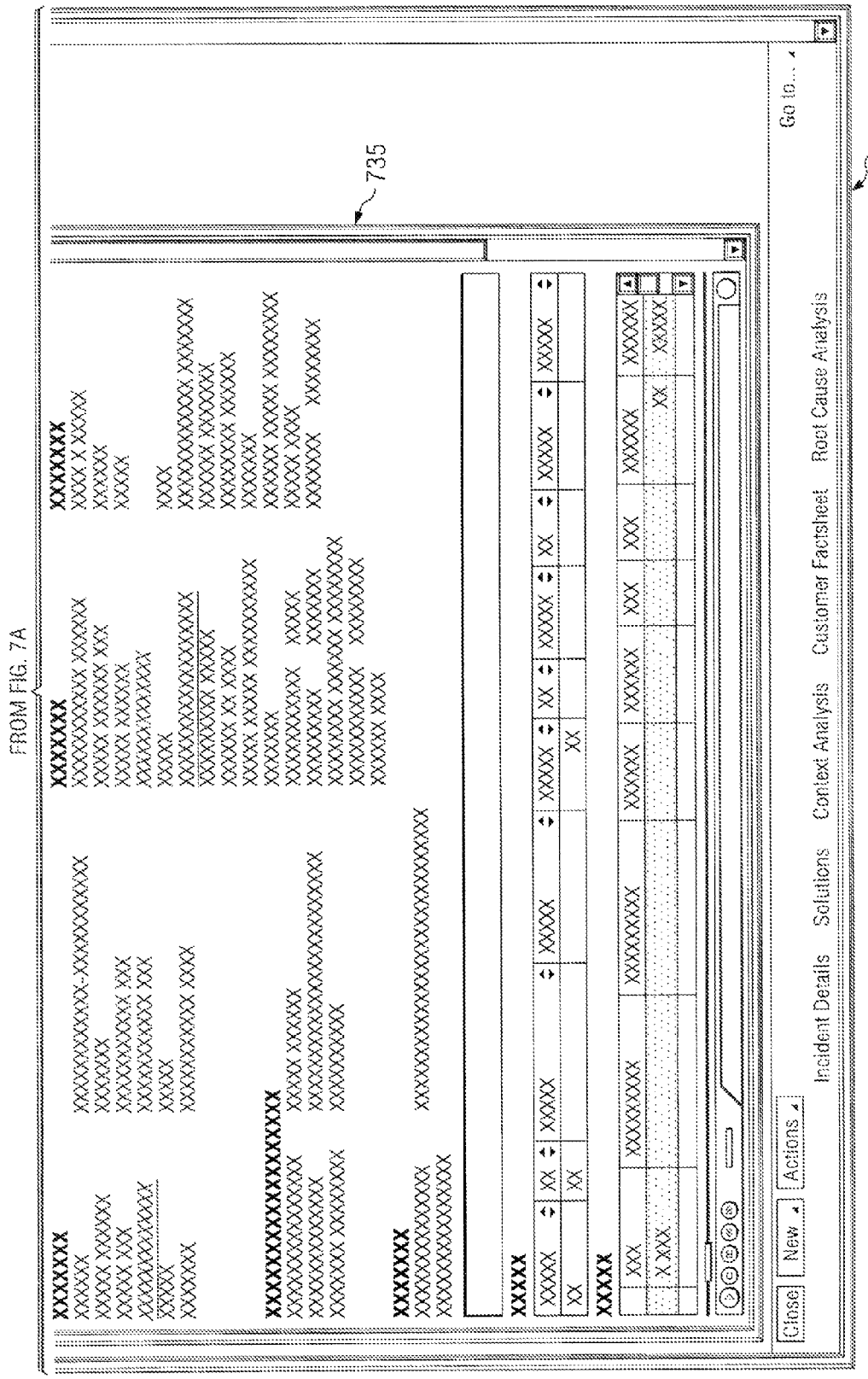

FIGS. 7A-7B provide one example of an illustration of the root cause analysis tab 305 described in FIG. 2D. The root analysis tab 305 may include a status field 705, a root cause analysis results field 710, an action field 725, and a presentation field 735. The status field 705 may provide an indication to users of the current status of the root cause analysis. The status may indicate whether a root cause analysis is possible (i.e., no connection available to the customer, etc.), whether a root cause analysis is in progress, or whether a root cause analysis is already available. Additional messages and status reports may also be included therein. The root cause analysis results field 710 may contain a listing of previously performed root cause analyses and their results, along with root cause analyses from other customers associated with technical errors similar to those experienced in the current situation. If a result is selected, then the details and analysis may appear in the presentation field 735. In some instances, presentation field 735 may provide a preview of the selected result. In those instances, users may activate the presentation field 735 such that a new window may be opened showing a larger or full screen view of the selected root cause analysis. If the result is a recorded remote session, a media device corresponding to the file type of the recorded session may be opened for viewing.

The action field 725 of FIG. 7A contains links that may cause the support application 152 to perform the steps described in FIG. 2D. For instance, a link 715 is present to initiate the simulated customer environment. When the link is activated, the support application 152 may cause the environment to be presented to the user. In some cases, the simulated environment may be displayed in the presentation field 735. In other instances, the simulated environment may be presented in a new window. In addition to the simulated customer environment link 715, the action field 725 also includes a link 720 for creating a new FAQ document. In situations where a new solution is developed, support personnel may choose to add a new FAQ document to the FAQ repository 172. In those situations, activating the link 720 may cause a form or other method of input to be opened in the presentation field 735 or a new window. Additionally, the remote session link 730 may be used to open a remote session with the customer system. By opening the remote session, the support personnel may work directly on the customer's business application 108 or software to enact the developed solution. The remote session may be launched in a dedicated remote session window, as well as the presentation field 735. If the support personnel determines that the proper solution is the development of a software update, then the new update link 740 may be activated and a message provided to the party responsible for generating software updates. Other elements may also be included in the root cause analysis tab 305 to provide for additional or supplemental functionality.

While the present disclosure uses flowcharts and accompanying descriptions to illustrate the exemplary method 200, environment 100 contemplates using or implementing any suitable technique for performing these and other tasks. It will be understood that these methods are for illustration purposes only and that the described or similar techniques may be performed at any appropriate time, including concurrently, individually, or in combination. In addition, many of the steps in these flowcharts may take place simultaneously and/or in different orders than as shown. Moreover, environment 100 may use methods with additional steps, fewer steps, and/or different steps, so long as the method remains appropriate.

Although this disclosure has been described in terms of certain embodiments and generally associated methods, alterations and permutations of these embodiments and methods will be apparent to those skilled in the art. Accordingly, the above description of example embodiments does not define or constrain the disclosure. Other changes, substitutions, and alterations are also possible without departing from the spirit and scope of this disclosure, and such changes, substitutions, and alterations may be included within the scope of the claims included herewith.

What is claimed is:

1. An article comprising software for supporting a business application, the software comprising computer-readable instructions stored on computer-readable, non-transient media and operable when executed to:
    receive error information and dynamic context information from a remote business application, the dynamic context information at least partially identifying a particular execution point of the business application and a portion of the business data associated with that execution point;
    present a search interface to a support user utilizing one or more search criteria that is automatically populated using the received information; and
    upon request of the support user, generate an execution environment for the support user that simulates the remote business application execution using the received error information and dynamic context information, the execution environment providing the support user a simulated, interactive visualization of the remote business application including the execution point where an error associated with the error information occurred.

2. The article of claim 1, wherein the remote business application comprises a client interface and a support agent operable to identify and communicate at least one of the error information and the dynamic context information.

3. The article of claim 1, wherein the remote business application comprises a client-side of a hosted solution.

4. The article of claim 1, wherein the execution environment is run using a temporary customer of the hosted solution.

5. The article of claim 1, wherein the remote business application is operating at a site unassociated with the support user.

6. The article of claim 1 further operable to retrieve static context information from a static context information repository, the static context information related to the remote business application.

7. The article of claim 6, wherein the execution environment for the support user is further generated using at least a portion of the retrieved static context information.

8. The article of claim 1, wherein the execution environment is operable to request additional business data from the remote business application.

9. The article of claim 8, wherein the execution environment comprises a debugging session running concurrently with the simulation.

10. The article of claim 1 further operable to communicate with a billing system to bill the client for the support user involvement.

11. A computer-implemented method for supporting a business application, comprising:
    receiving error information and dynamic context information from a remote business application, the dynamic context information at least partially identifying a particular execution point of the business application and a portion of the business data associated with that execution point;

presenting a search interface to a support user utilizing one or more search criteria that is automatically populated using the received information; and upon request of the support user, generating a virtual business application execution environment for the support user that simulates the remote business application execution using the received information, the virtual business application execution environment providing the support user a simulated, interactive visualization of the remote business application including the execution point where an error associated with the error information occurred.

12. The method of claim 11 further comprising retrieving static context information from a static context information repository, the static context information related to the remote business application.

13. The method of claim 12, wherein generating the execution environment for the support user further comprises using at least a portion of the retrieved static context information.

14. The method of claim 11, wherein the remote business application comprises a client-side of a hosted solution.

15. The method of claim 11, wherein the execution environment is run using a temporary customer of the hosted solution.

16. The method of claim 11, wherein the remote business application is operating at a site unassociated with the support user.

17. A system comprising:
a memory for storing information; and
at least one hardware processor operable to execute instructions to:

receive error information and dynamic context information from a remote business application, the dynamic context information at least partially identifying the particular execution point of the business application and a portion of the business data associated with that execution point;

retrieve static context information from a static context information repository, the static context information related to the remote business application;

present a search interface to a support user utilizing one or more search criteria that is automatically populated using the received information; and upon request of the support user, generate a virtual business application execution environment for the support user that simulates the remote business application execution using at least a portion of the received error and dynamic context information and at least a portion of the retrieved static context information, the virtual business application execution environment providing the support user a simulated, interactive visualization of the remote business application including the execution point where an error associated with the error information occurred.

18. The system of claim 17 wherein the one or more hardware processors are further operable to interact and communicate with a billing system.

19. The system of claim 17, wherein the execution environment for the support user is further generated using at least a portion of the retrieved static context information.

20. The system of claim 17, wherein the execution environment is further operable to request additional business data from the remote business application.

21. The method of claim 1, wherein the search interface automatically populates using solved-error information stored in a repository.

* * * * *